March 14, 1967   J. SARGENT ET AL   3,309,678
SEQUENCE INDICATING MONITORING SYSTEM
Original Filed Sept. 6, 1962   25 Sheets-Sheet 3

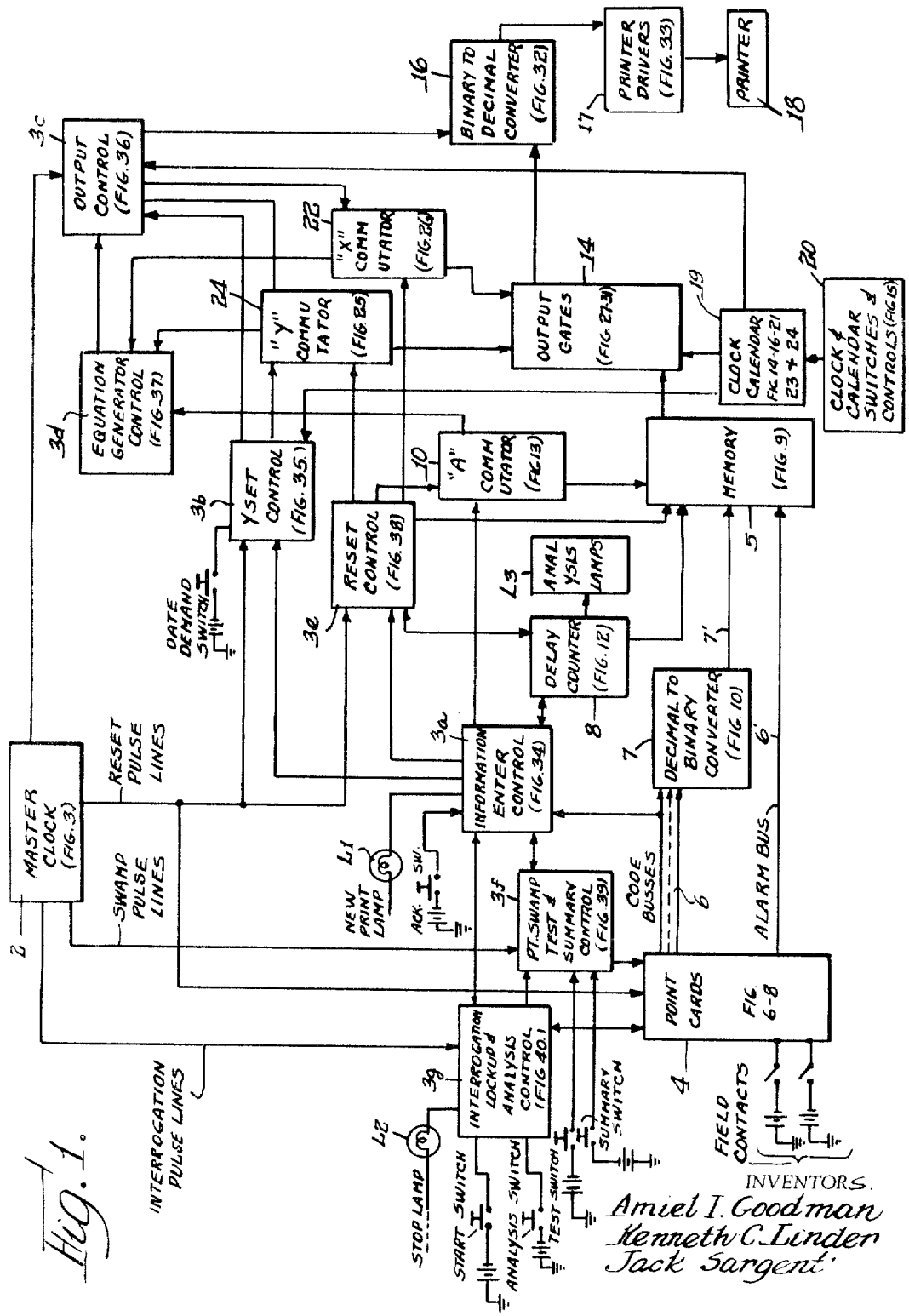

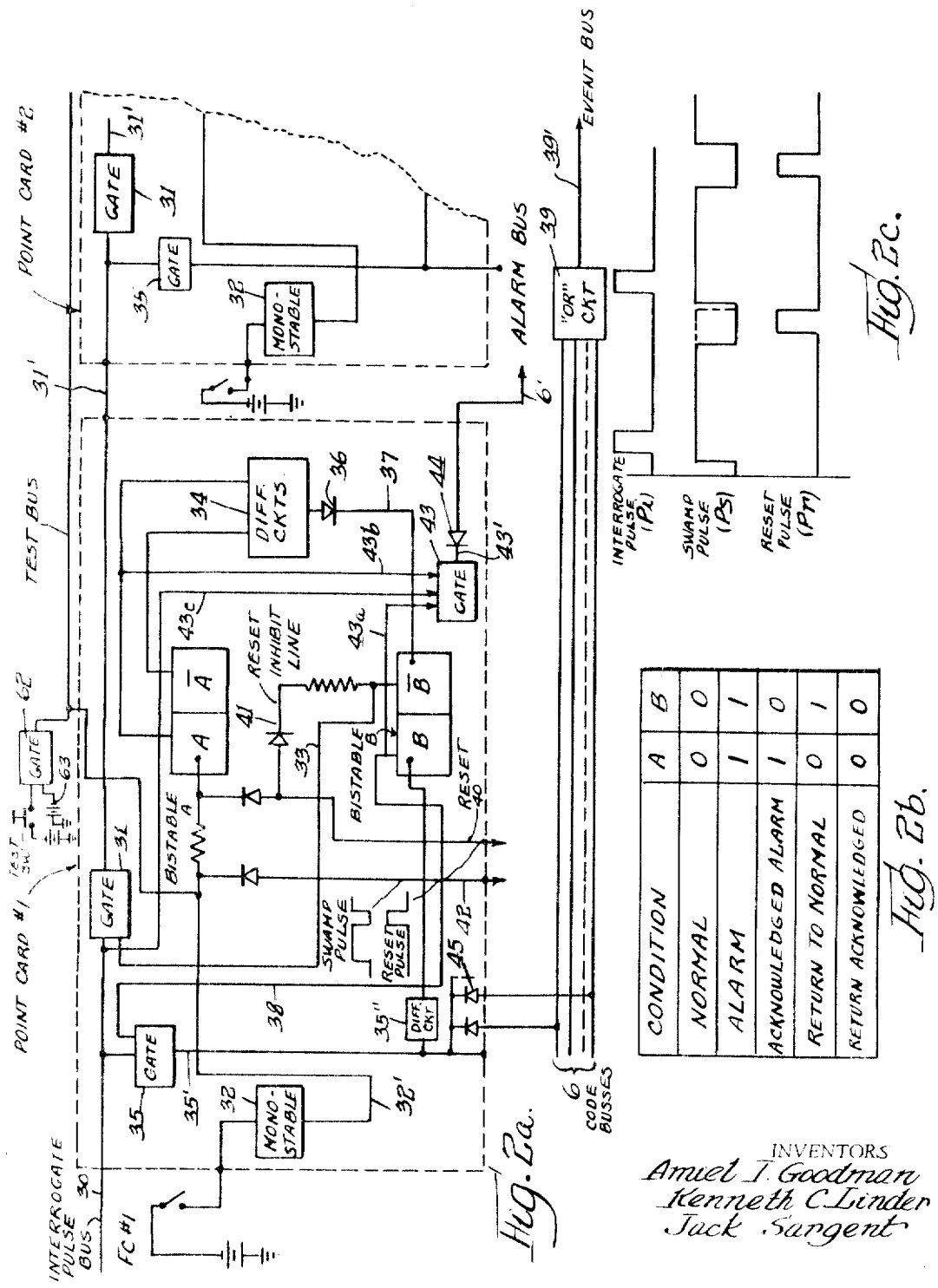

INVENTORS
Amiel I. Goodman
Kenneth C. Linder
Jack Sargent

March 14, 1967 J. SARGENT ET AL 3,309,678
SEQUENCE INDICATING MONITORING SYSTEM
Original Filed Sept. 6, 1962 25 Sheets-Sheet 4
Fig. 3a.
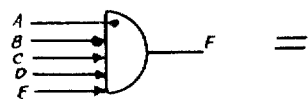 = 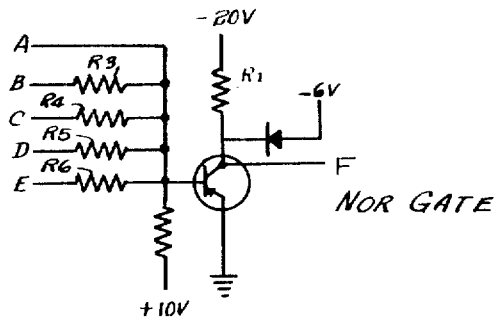
NOR GATE
Fig. 3b.
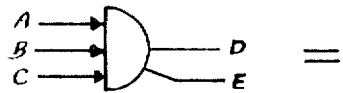 = 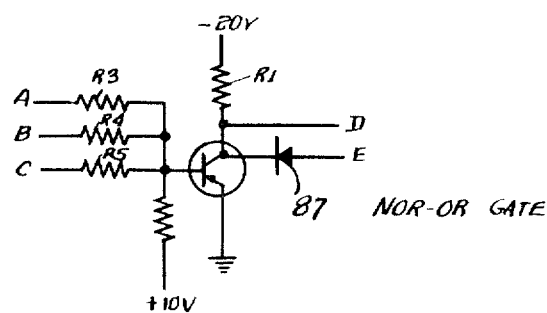
NOR-OR GATE
Fig. 3c.
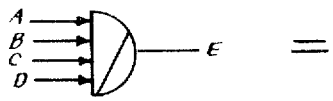 = 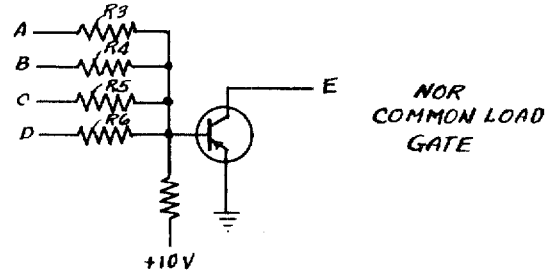
NOR COMMON LOAD GATE
Fig. 3d.
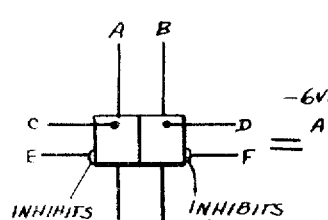
FLIP FLOP CKT.
INVENTORS
Amiel I. Goodman
Kenneth C. Linder
Jack Sargent

March 14, 1967 J. SARGENT ET AL 3,309,678
SEQUENCE INDICATING MONITORING SYSTEM
Original Filed Sept. 6, 1962          25 Sheets-Sheet 5
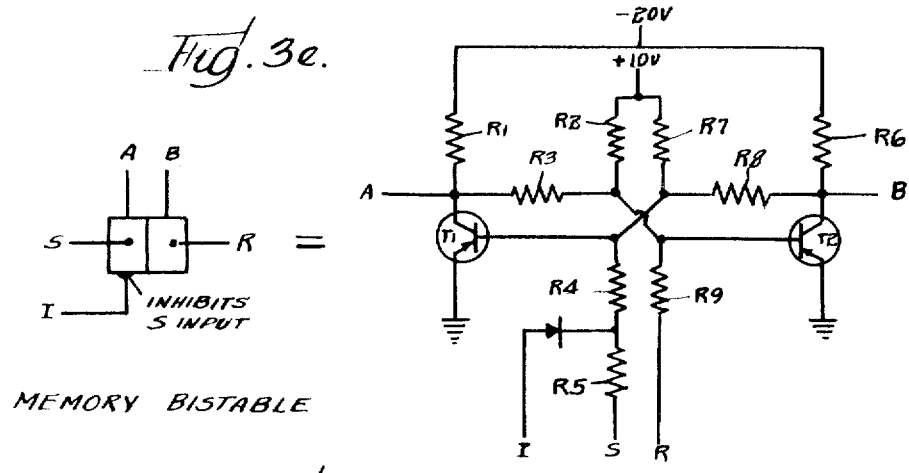
*Fig. 3e.* MEMORY BISTABLE
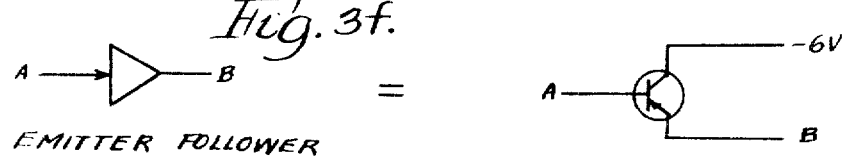
*Fig. 3f.* EMITTER FOLLOWER
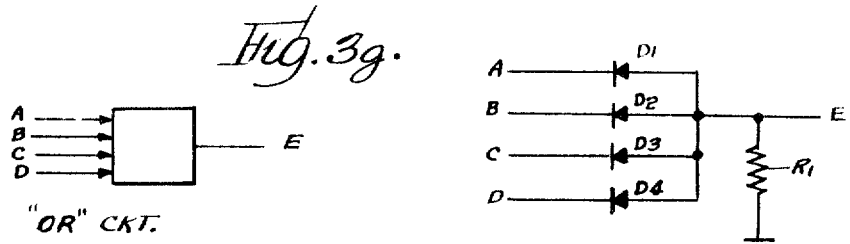
*Fig. 3g.* "OR" CKT.
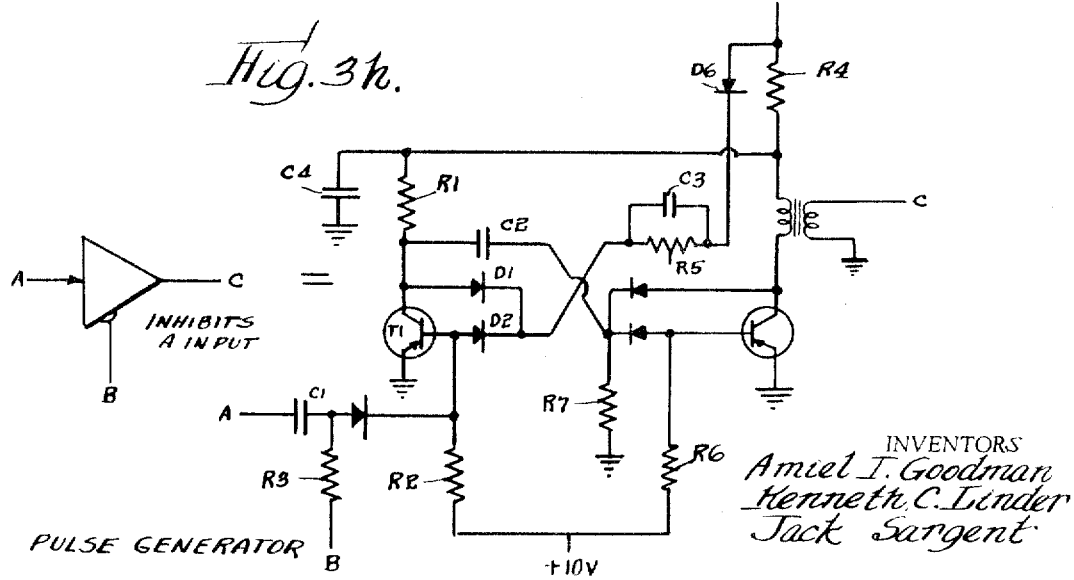
*Fig. 3h.* PULSE GENERATOR
INVENTORS
Amiel I. Goodman
Kenneth C. Linder
Jack Sargent March 14, 1967 J. SARGENT ET AL 3,309,678
SEQUENCE INDICATING MONITORING SYSTEM
Original Filed Sept. 6, 1962 25 Sheets-Sheet 6

INVENTORS
Amiel I. Goodman
Kenneth C. Linder
Jack Sargent

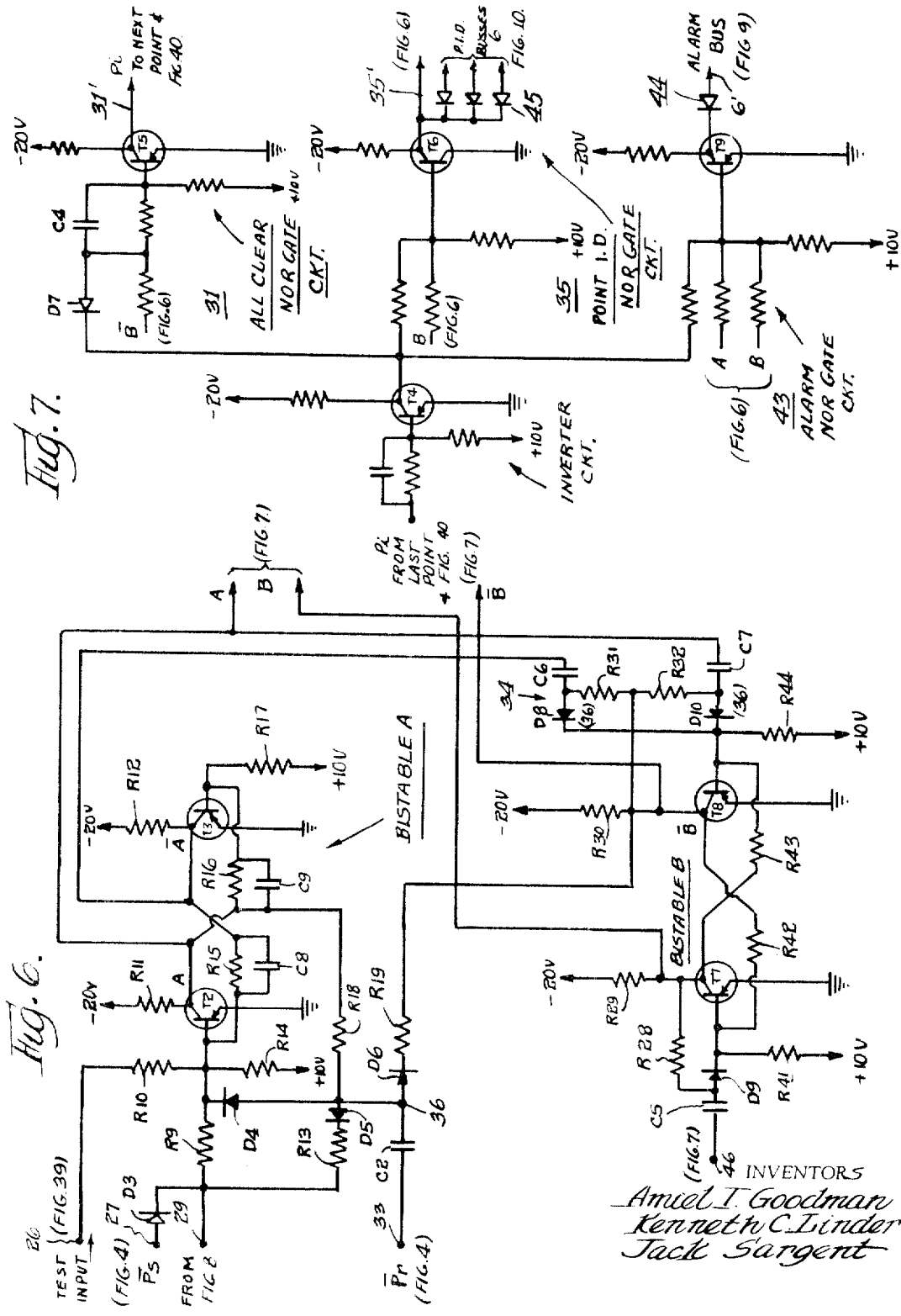

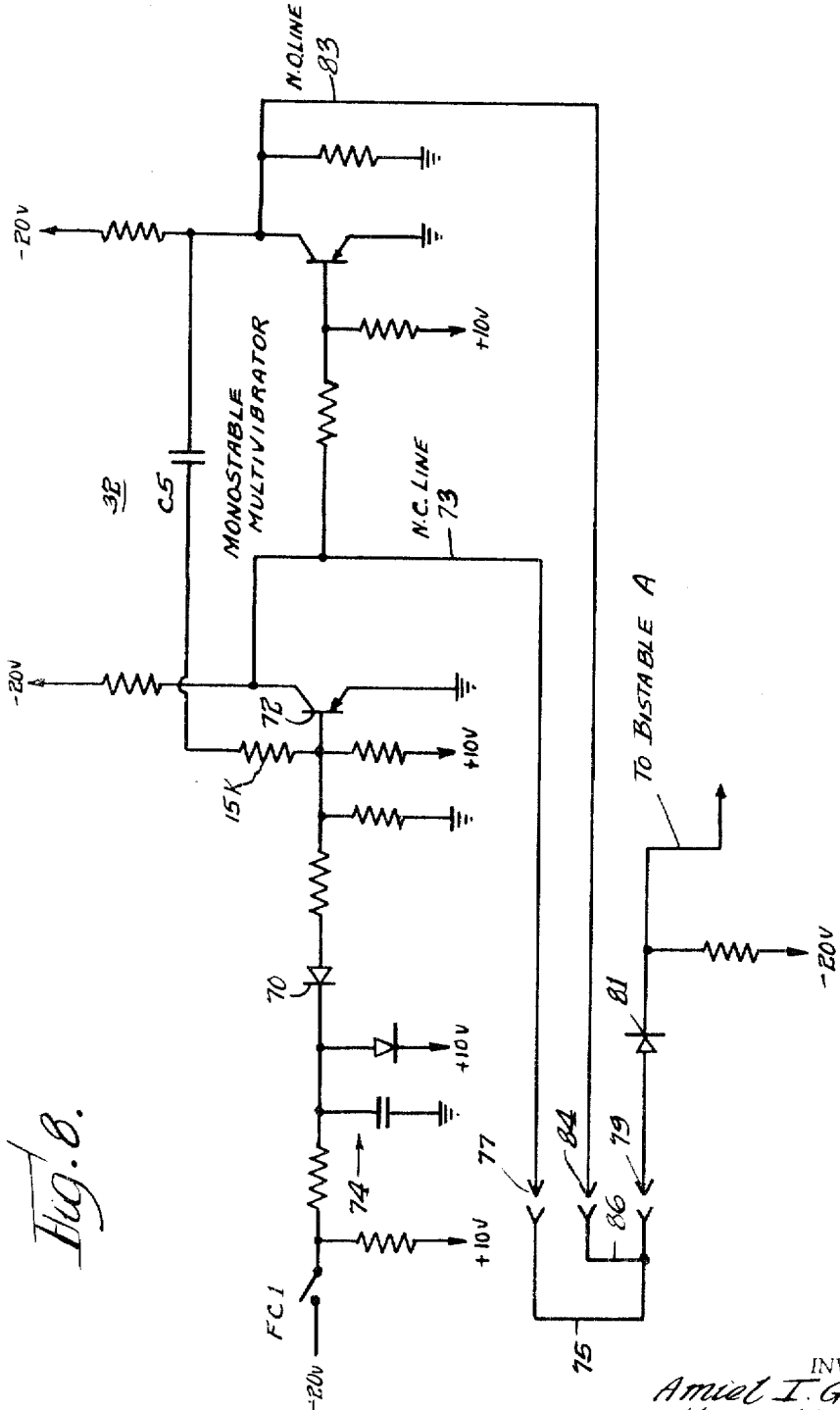

March 14, 1967 J. SARGENT ET AL 3,309,678
SEQUENCE INDICATING MONITORING SYSTEM
Original Filed Sept. 6, 1962 25 Sheets-Sheet 9

INVENTORS
Amiel I. Goodman
Kenneth C. Linder
Jack Sargent

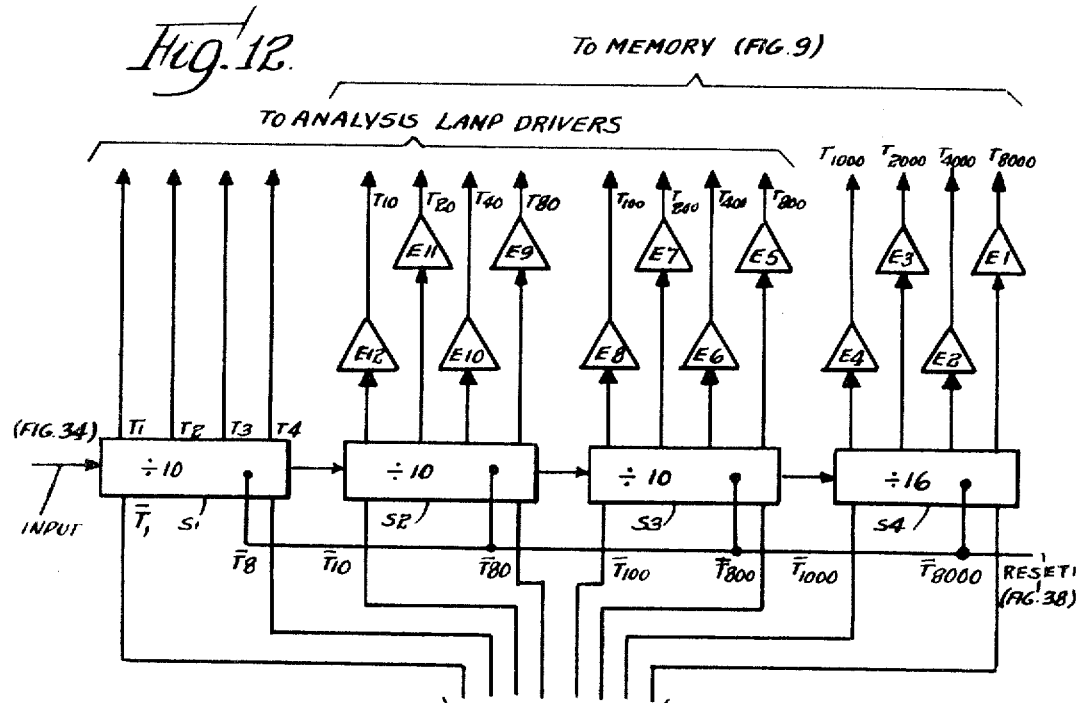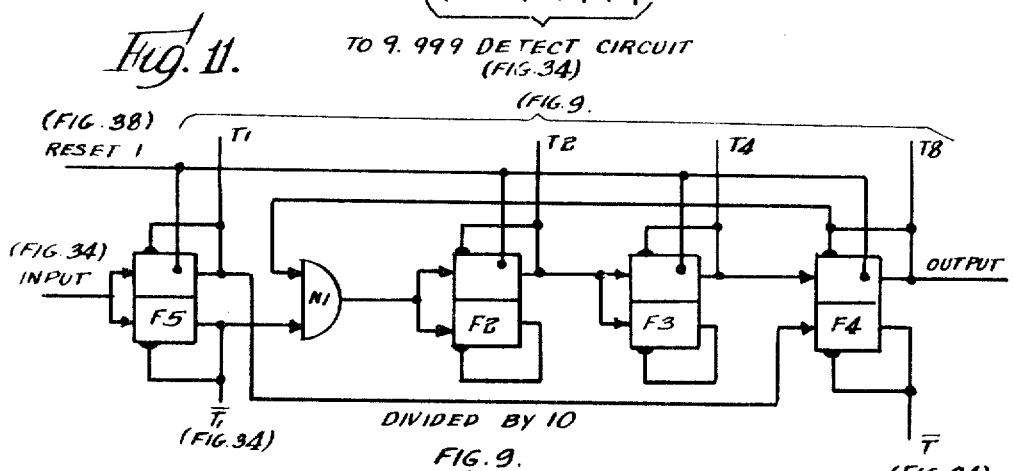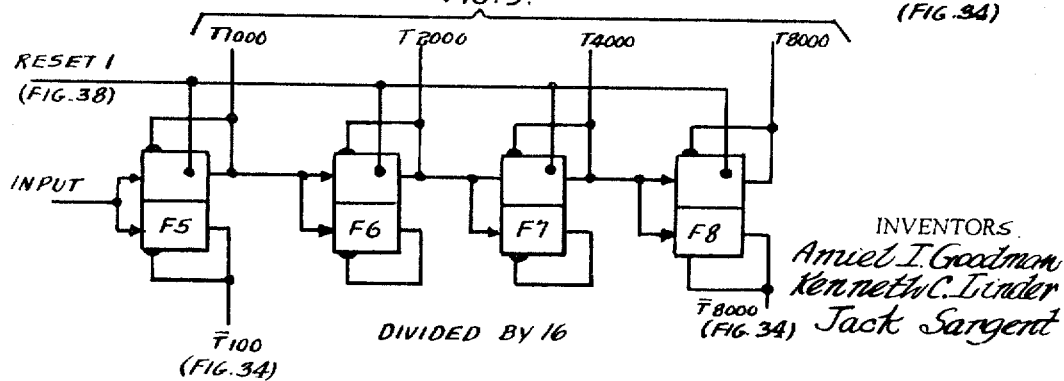

March 14, 1967  J. SARGENT ET AL  3,309,678
SEQUENCE INDICATING MONITORING SYSTEM
Original Filed Sept. 6, 1962  25 Sheets-Sheet 11
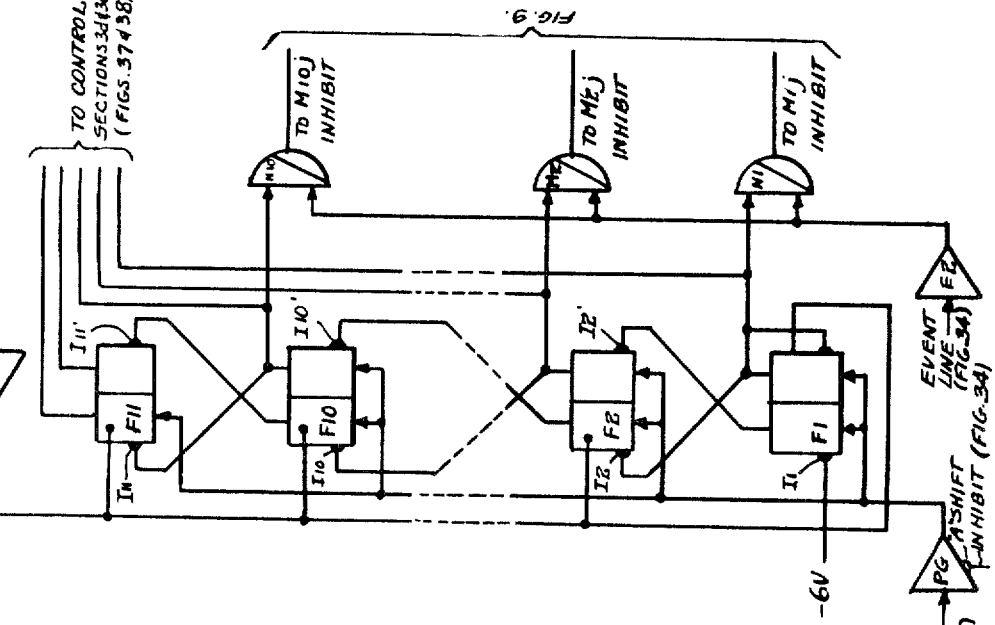
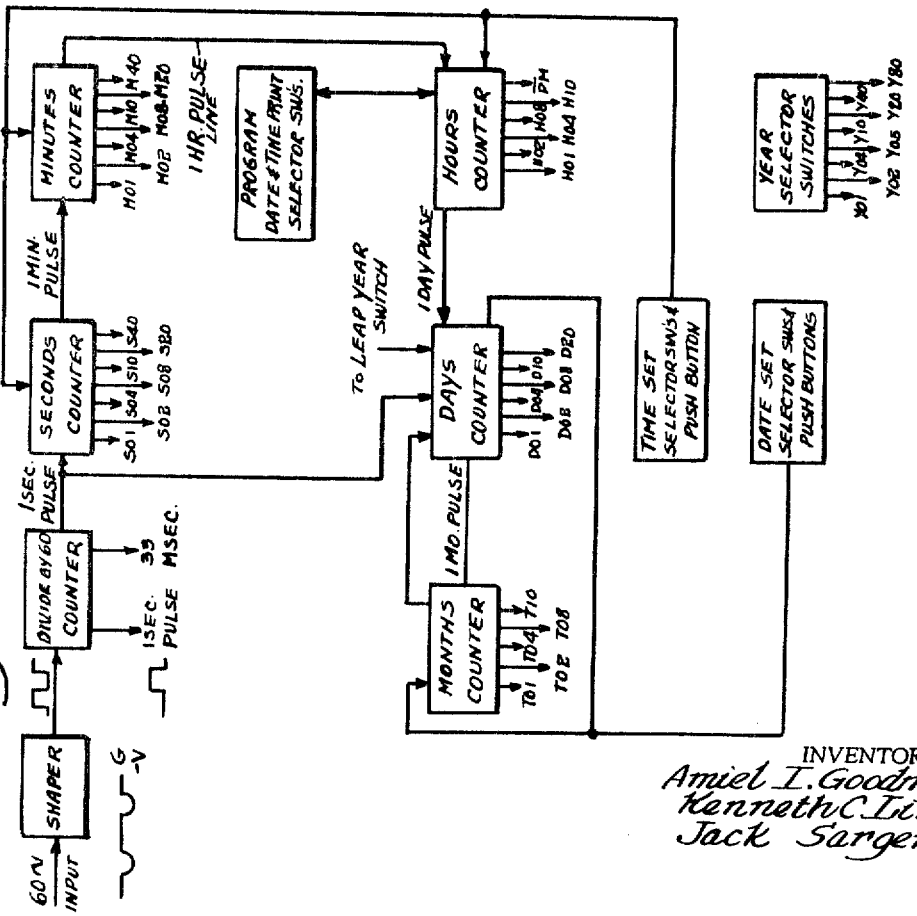
INVENTORS
Amiel I. Goodman
Kenneth C. Linder
Jack Sargent

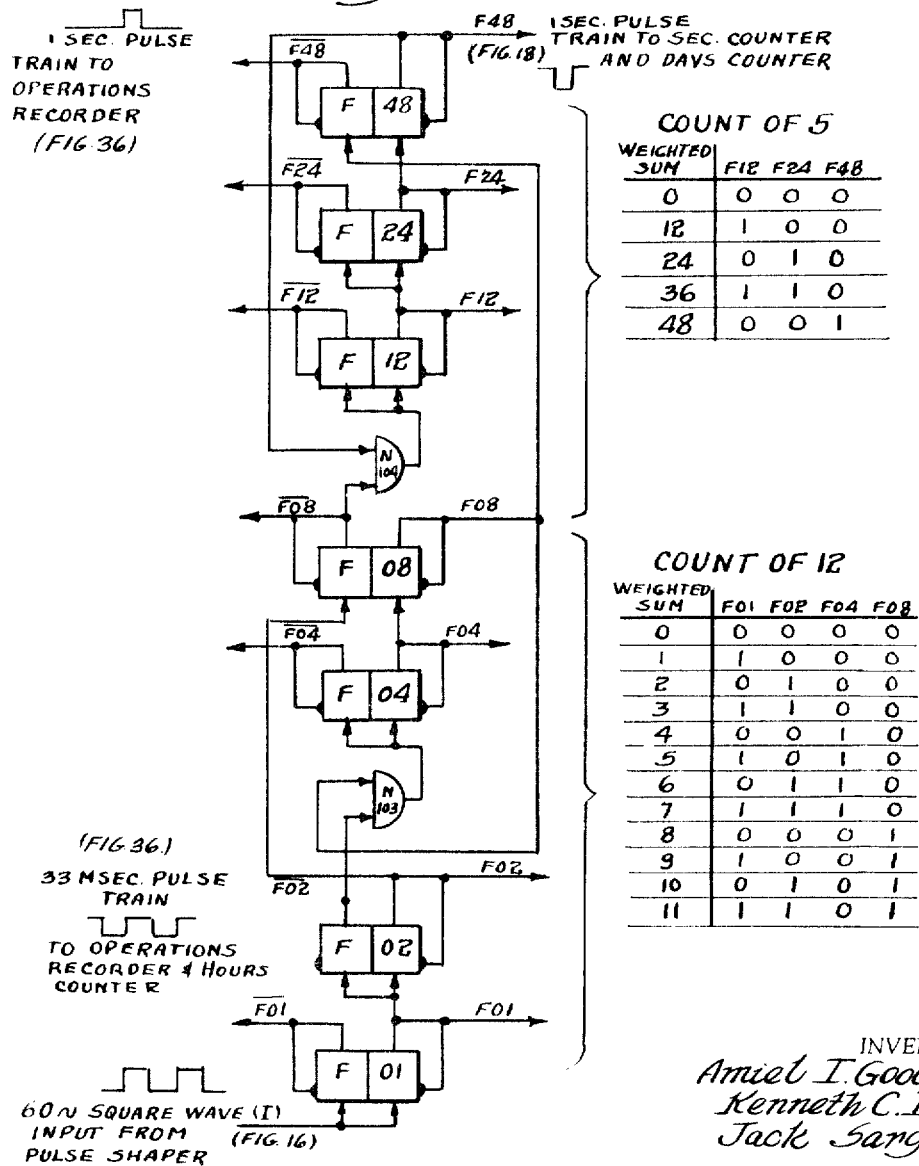

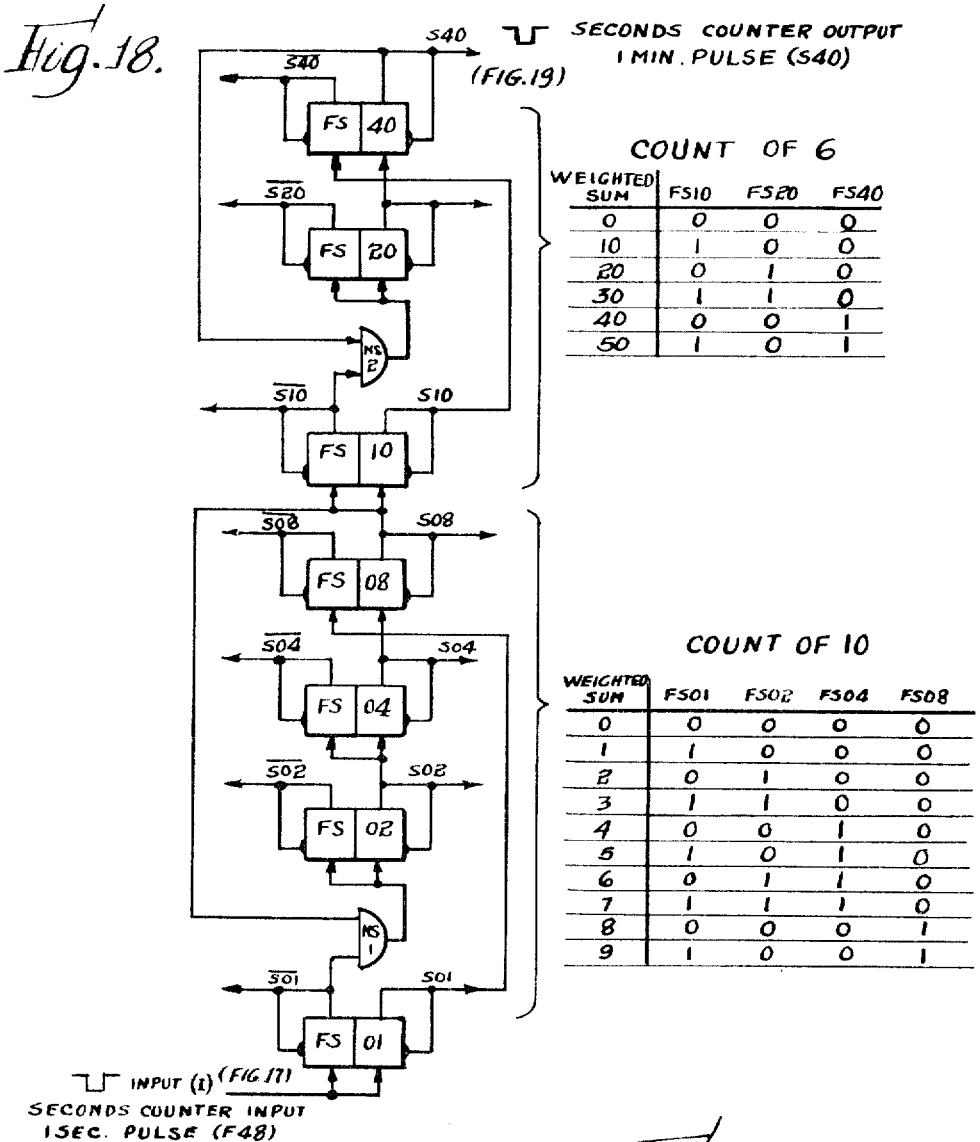
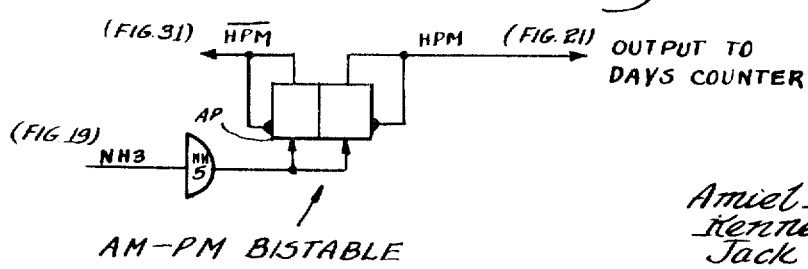

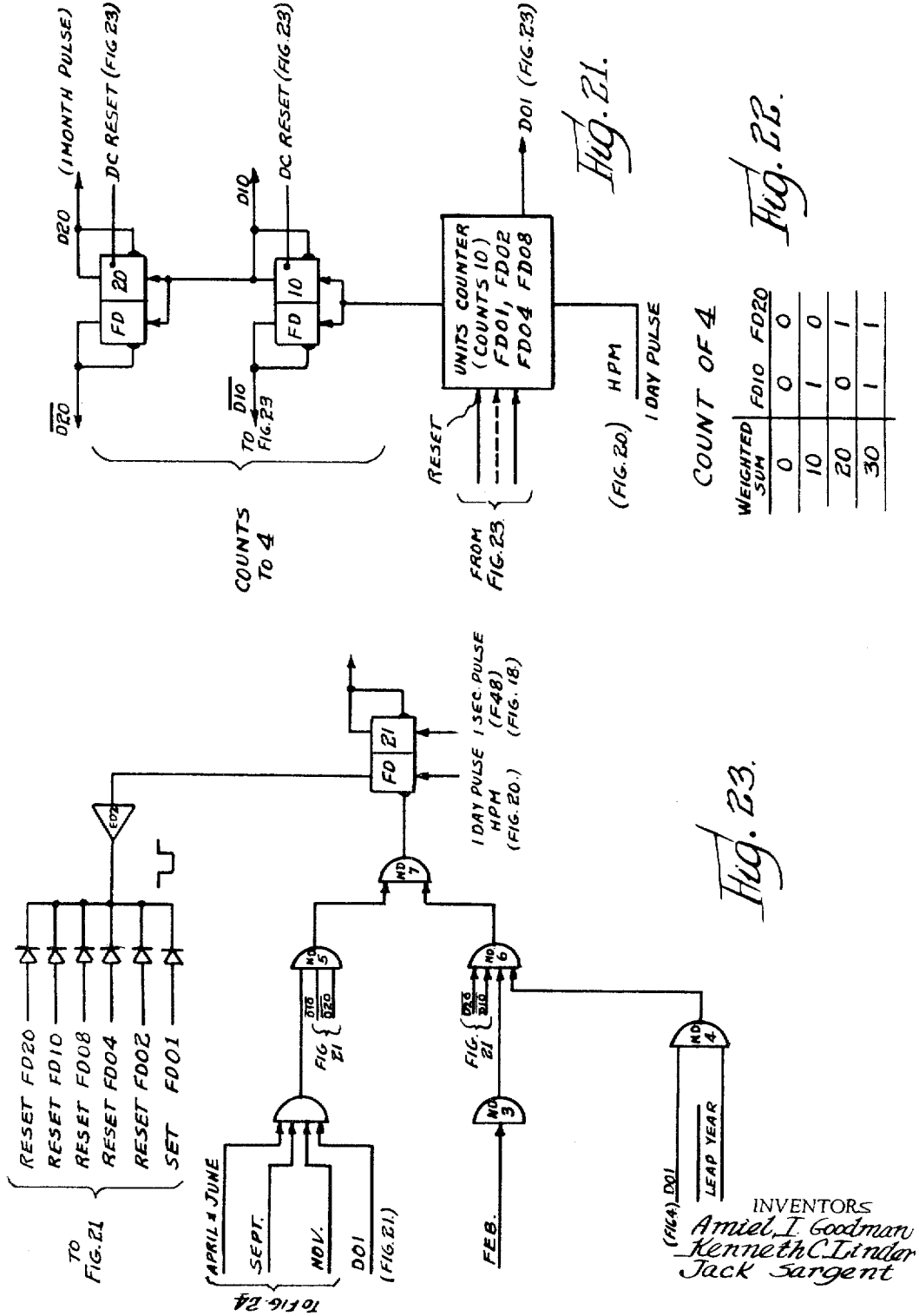

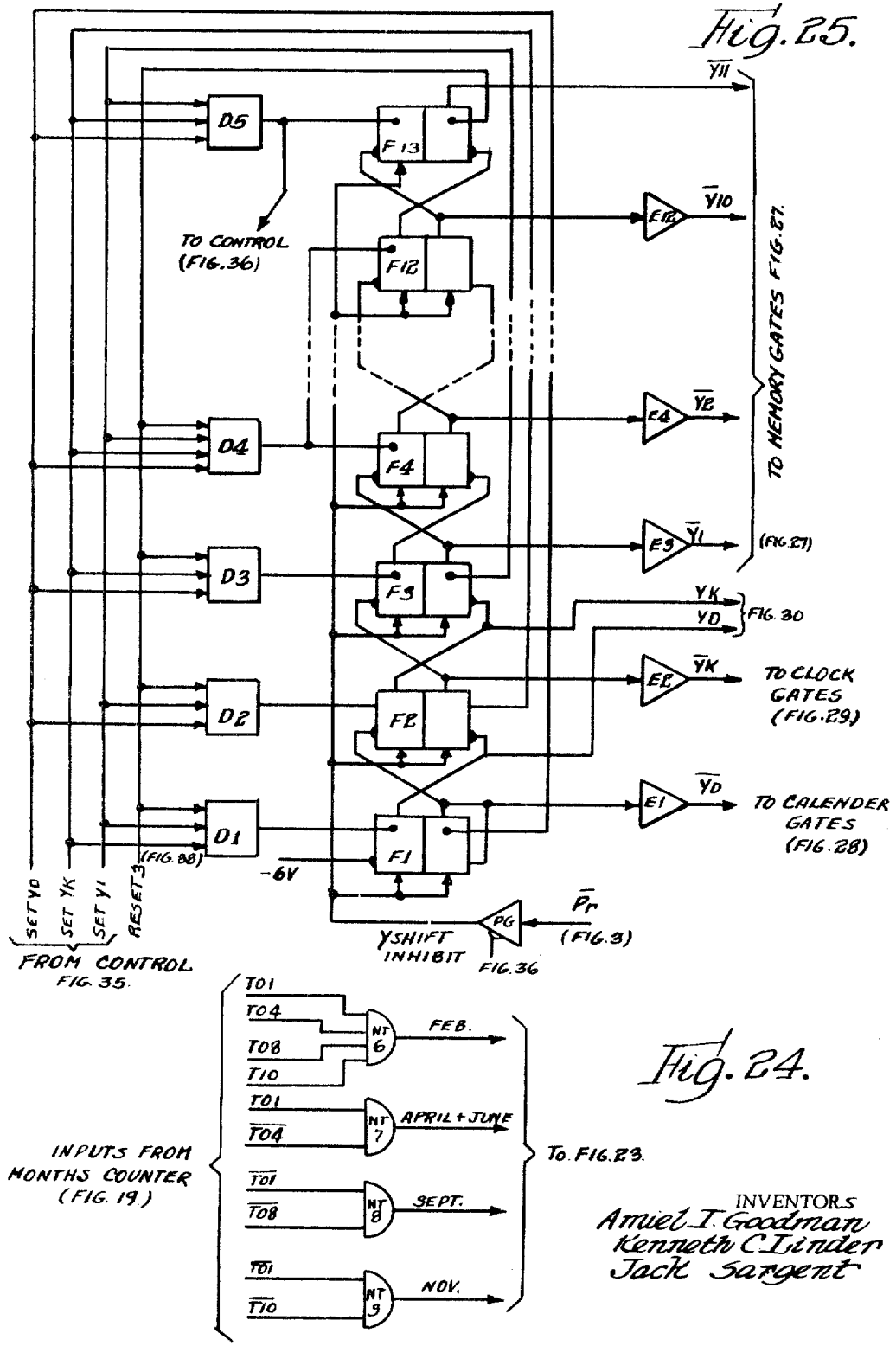

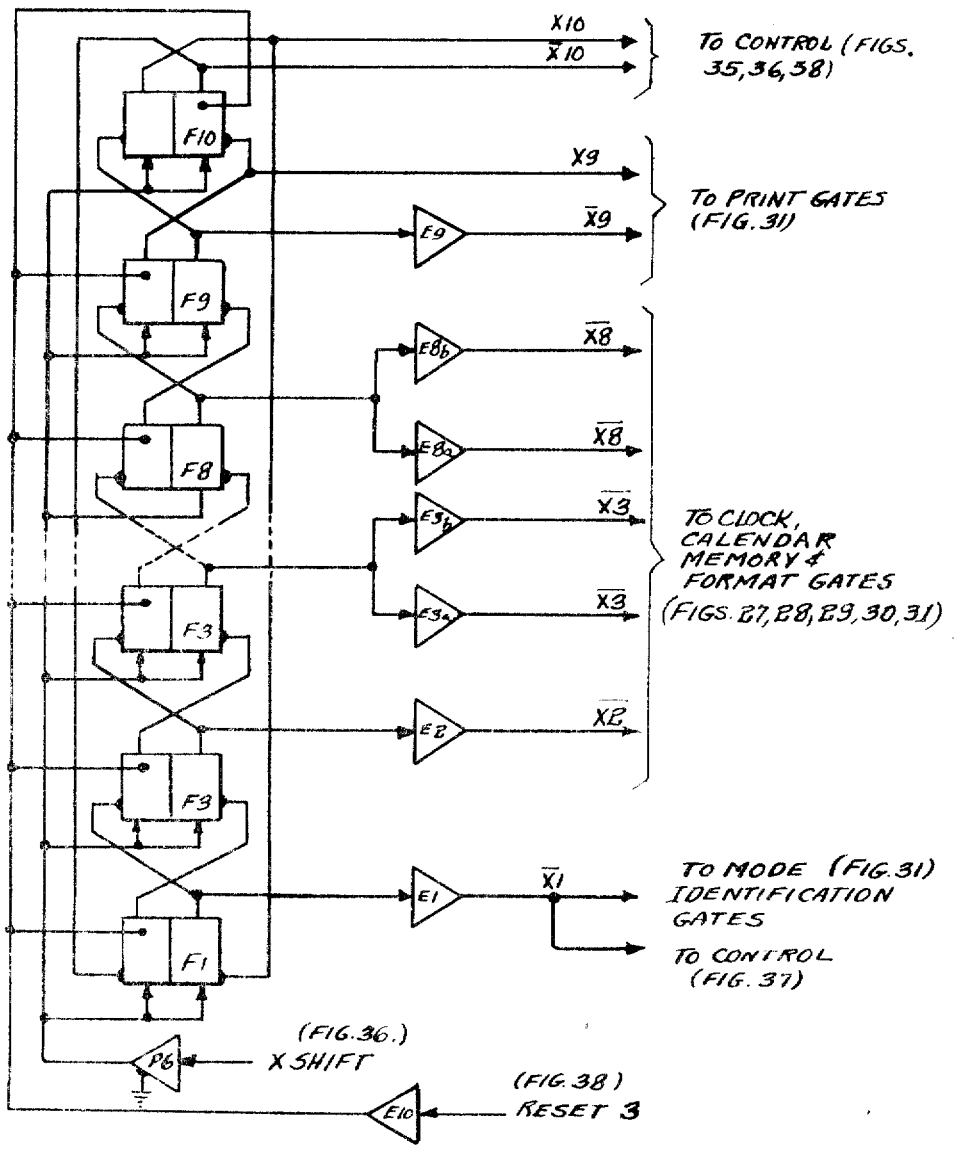

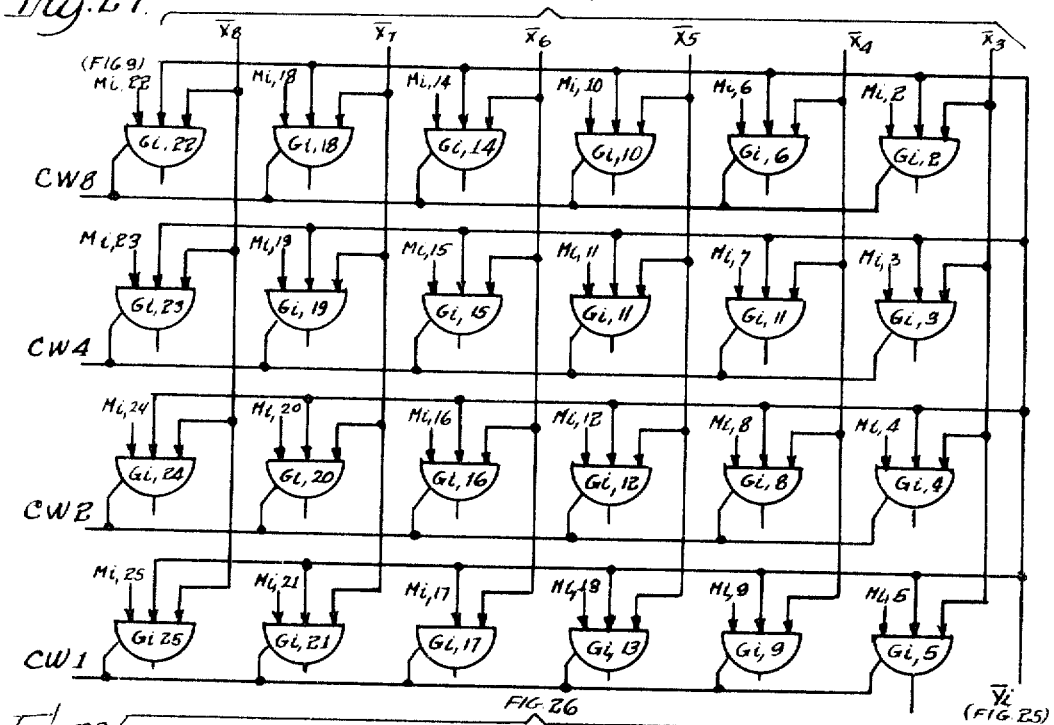
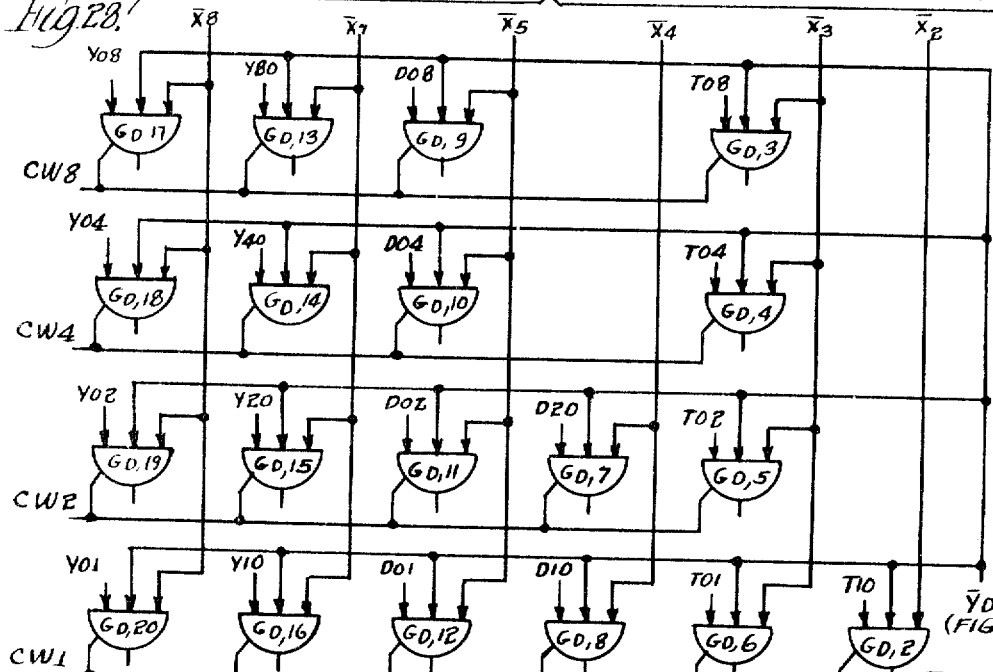

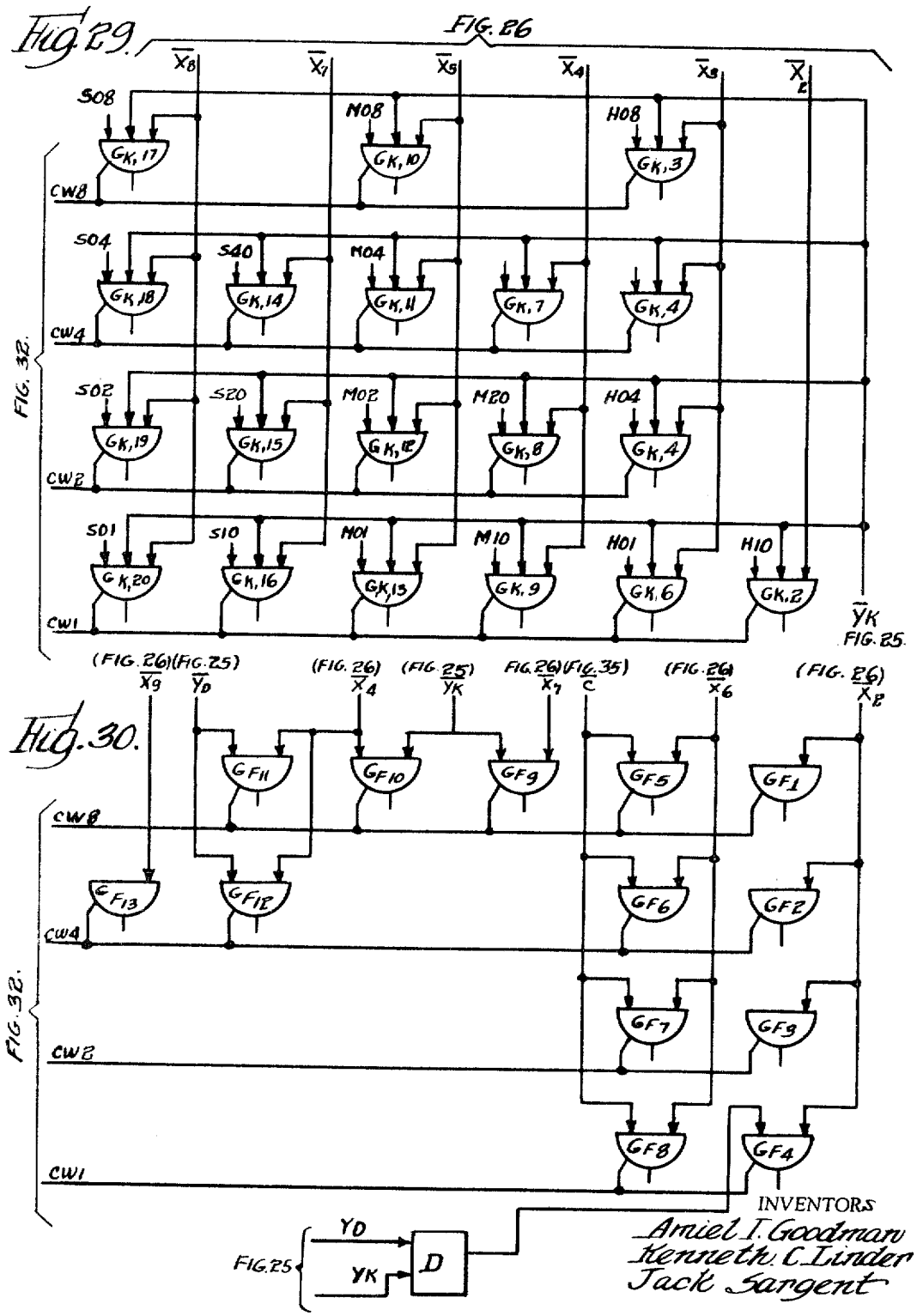

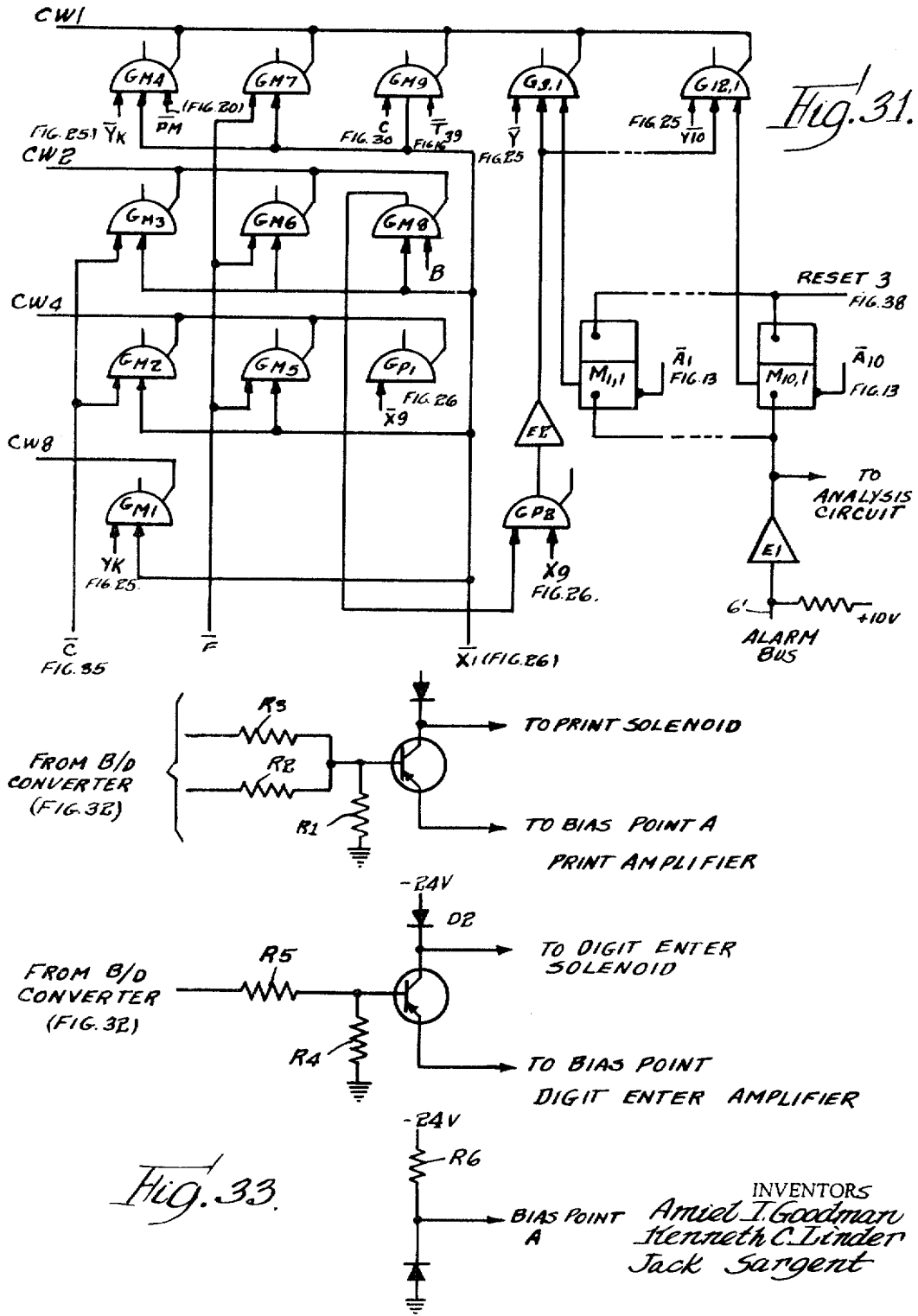

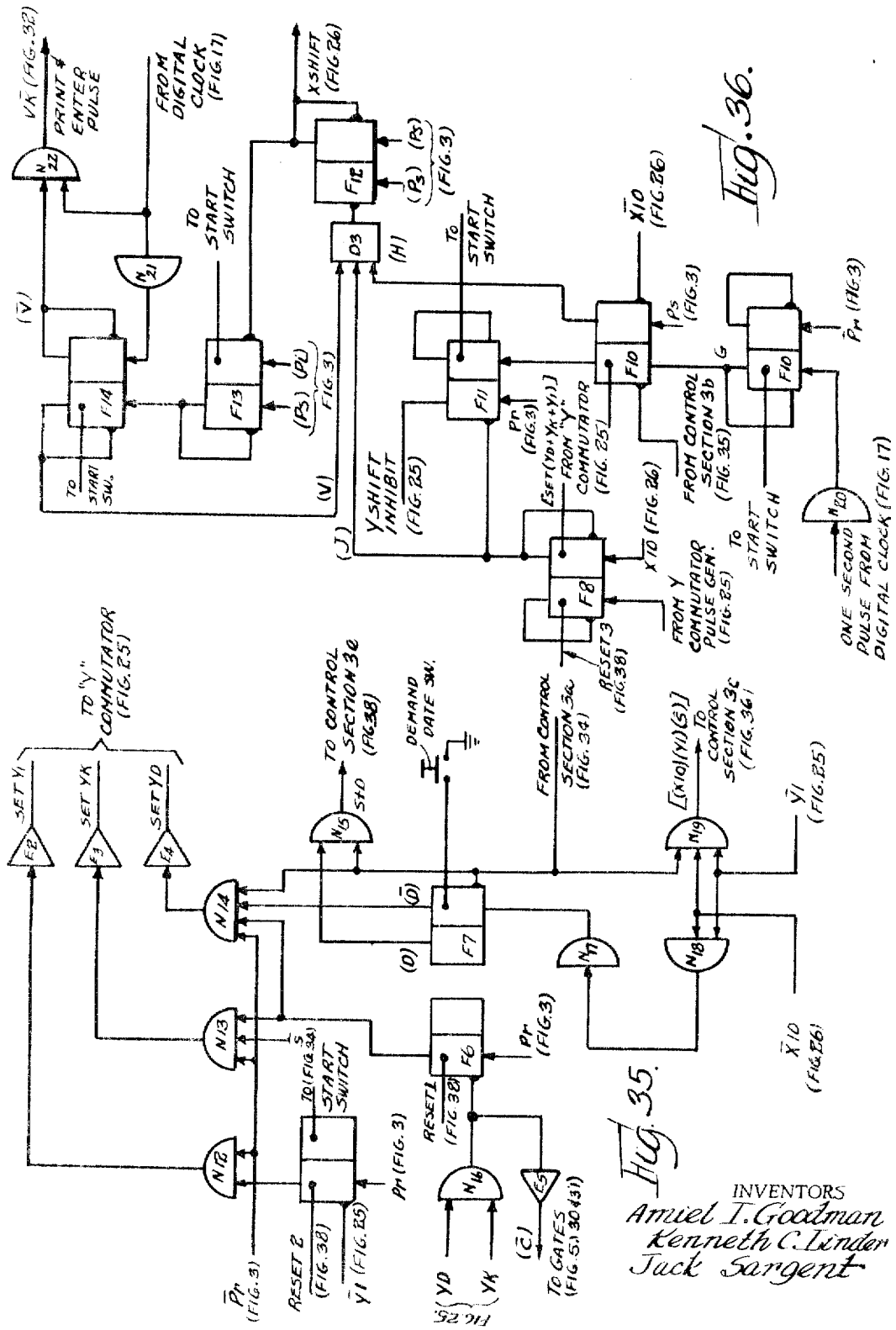

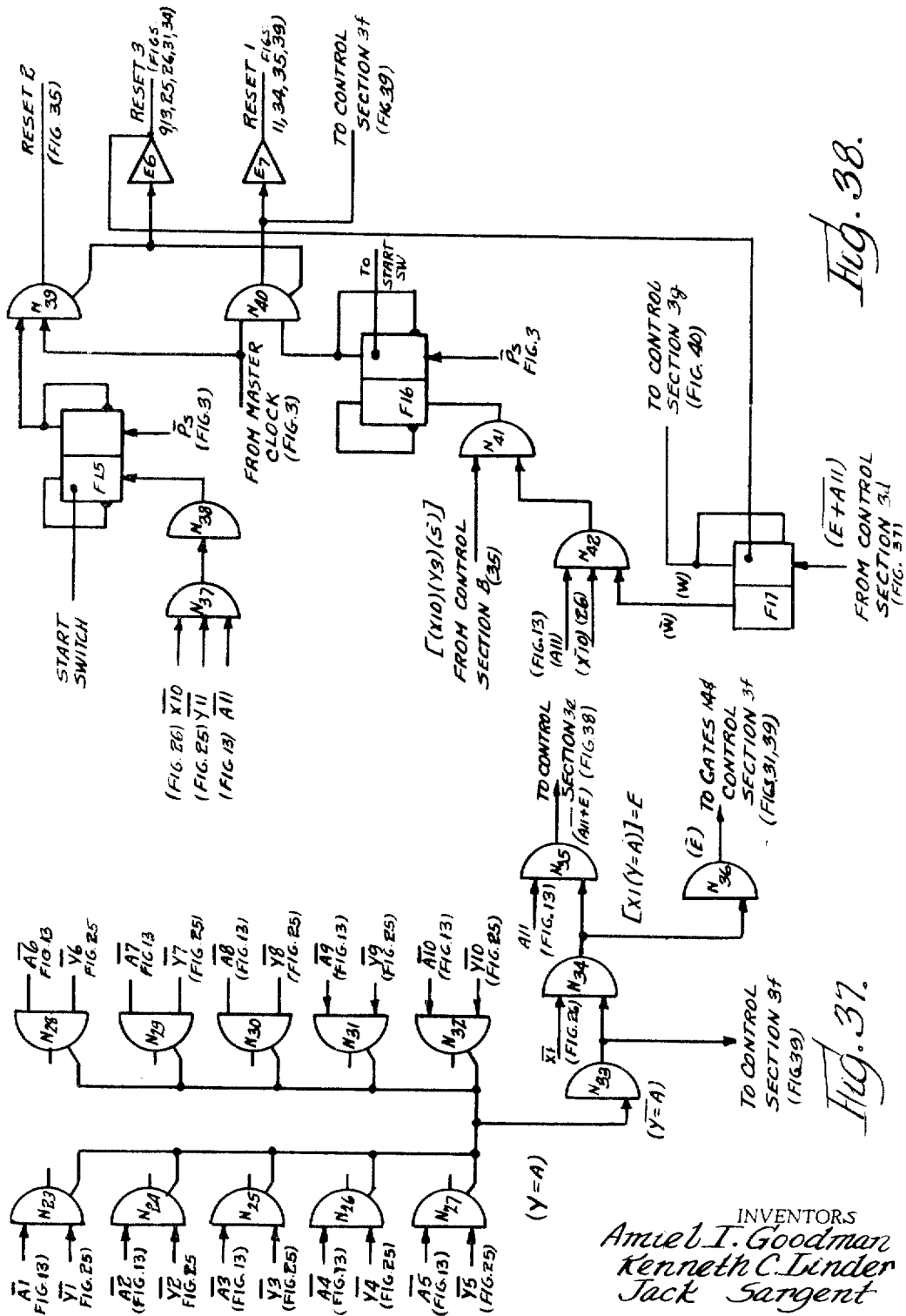

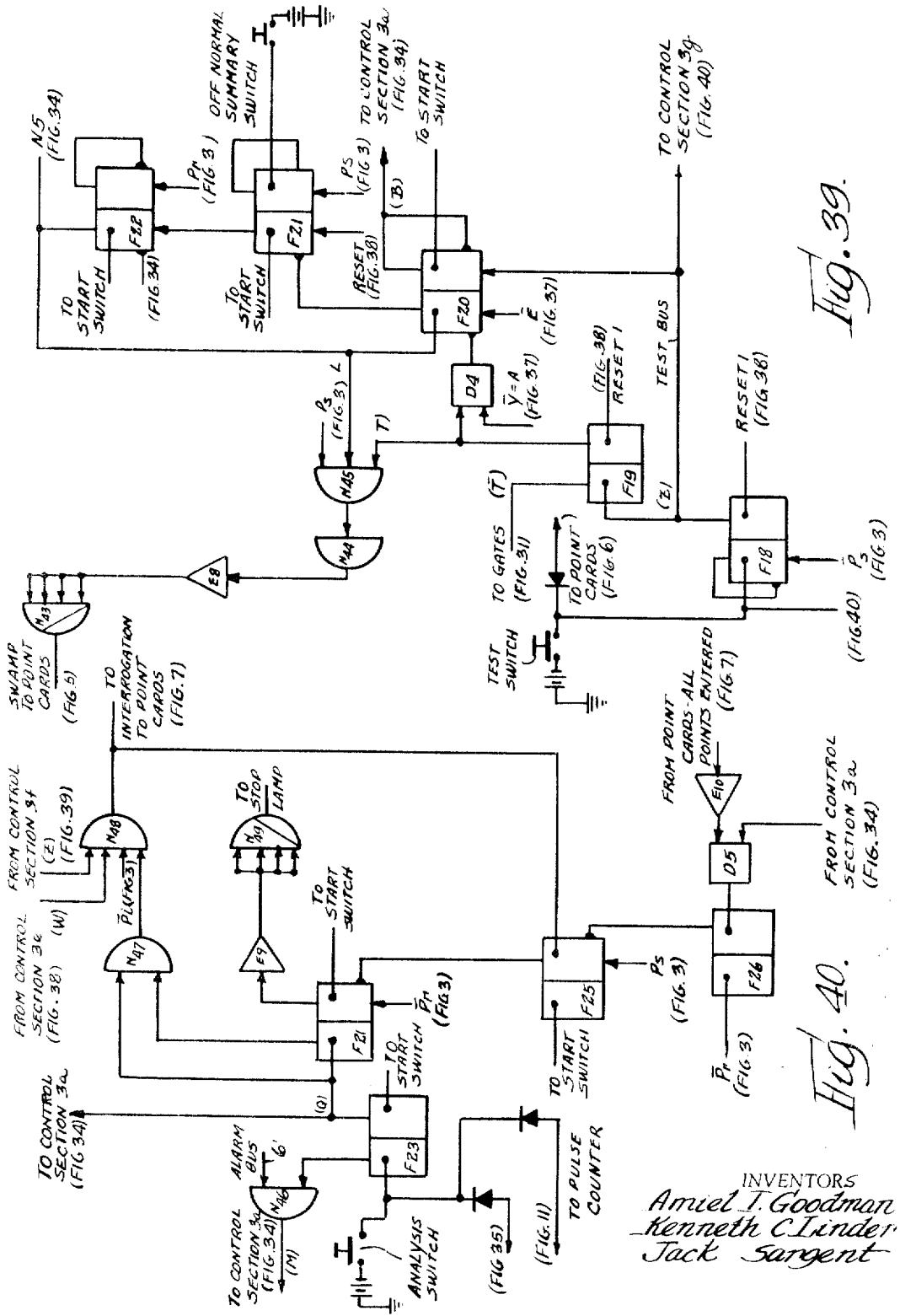

United States Patent Office 3,309,678
Patented Mar. 14, 1967

3,309,678
SEQUENCE INDICATING MONITORING SYSTEM
Jack Sargent, Skokie, and Kenneth C. Linder, Arlington Heights, Ill., and Amiel I. Goodman, Waltham, Mass., assignors, by mesne assignments, to The Scam Instrument Corporation, Skokie, Ill., a corporation of Illinois
Original application Sept. 6, 1962, Ser. No. 221,828. Divided and this application Oct. 18, 1965, Ser. No. 516,806
5 Claims. (Cl. 340—172.5)

This invention relates to variable monitoring systems, more particularly to systems which monitor a number of variables to determine and record the order in which the variables go abnormal or return to normal in sequence. Some aspects of the invention, however, have a more general application. This application is a division of the copending application of Jack Sargent et al., Ser. No. 221,828, filed Sept. 6, 1962.

As industry grows more complex, there is a greater need for automatic monitoring systems capable of reacting quickly and reliably. The function of a monitoring alarm system is two-fold. First, it must provide an indication when a monitored variable exceeds or returns to a preset limit. Second, when many interrelated variables are being monitored, the information desired should be put into a permanent printed record that is easy to interpret to determine the basic cause of failure. The present invention is a monitoring system designed to meet this need.

The monitored variable (pressure, temperature, voltage, etc.) opens or closes a mechanical or electrical switch (through a transducer if necessary) when the preset limit is exceeded. The switch returns to its normal condition when the variable falls back to its normal operating region.

Variable monitoring systems of the type above outlined have been heretofore developed with varying degrees of success. Most of these systems had one or more drawbacks, such as long resolution times, inability to respond to momentary alarms, scrambling of information where variables go abnormal simultaneously and loss of information where the capacity of the memory involved is exceeded.

It is an object of the present invention to provide a variable monitoring system which avoids the drawbacks of the variable monitoring systems referred to above. More specifically, it is an object of the present invention to provide a variable monitoring system which does not lose momentary alarms, can receive and record without scrambling of information variables which become abnormal in a time less than the resolution time of the monitoring system, and which does not lose information even when the capacity of its memory is exceeded.

In the preferred monitoring system of the present invention, there is a variable condition sensing circuit associated with each variable. Each circuit is preferably (although not necessarily) a transistorized circuit placed on a printed circuit card to be referred to as a point card. The occurrence of one or more events to be monitored in sequence, such as the abnormality or return to normal of a variable, is noted by the point card which transmits the point identification and the type of event to a storage unit which stores information identifying the nature of the event (i.e., new abnormal or return to normal event), the identity of the variable, and the time of the event relative to the first event in a series of events occurring in sequence.

The monitoring system of the present invention is preferably a self synchronized system; that is, the control functions operate in step with internal pulses generated by a master clock within the system. Since the events occur at random times and the manual control functions are also operated at random times with respect to the master clock, the system synchronizes these inputs to the master clock.

The resolution time of the monitoring system is the time it takes the system to sample all the point cards in sequence by a method of serial interrogation which is one very important aspect of the invention which avoids many of the disadvantages of prior systems referred to above. The serial interrogation technique used in the preferred form of the invention utilizes a pulse generated by the central system (called the interrogation pulse) which is propagated serially through the point cards. That is, the pulse enters the first point card, and if no event had occurred since the previous interrogation pulse had entered, it will continue down and enter the next point card in the series and so on down the line. Therefore, if no event had occurred at any of the point cards, the interrogation pulse will proceed through every point card and come back into the system. However, if an unacknowledged event had occurred, the interrogation pulse will not continue past that point card, but will be sent directly into the system from the evented point card. At the time that the pulse is sidetracked in the above manner, it acknowledges the point card so that the succeeding interrogation pulse will propagate through the card and continue on down to pick up the next event that may occur at another card during the next interrogation cycle. During the time that an interrogation pulse is being propagated through the point cards, the inputs from the field contacts are gated out by a pulse called the swamp pulse to avoid changes in the pulse path from a point card in the middle of an interrogation pulse which could result in the sending of event information from more than one point card during an interrogation cycle which would result in scrambling of the event information displayed by the system. When the pulse is sidetracked by an evented point card, it is transmitted to appropriate coded busses. This identifies that point with a point identification number. One additional bus is used to indicate an alarm or a return-to-normal state of the point involved. This information is then entered into memory.

Within the preferred system of the invention, there is a counter which counts the time between the first event of a sequence and any subsequent event of the sequence which may occur before the printer can enter the information stored in memory. If a sequence occurs, the time difference between each event and the first event of the sequence is entered into the memory in conjunction with the point identification and the state identification of that particular point. The first event of a sequence also initiates printer operation. The output circuitry then causes the printer to print out the time of day and the information that has been stored in memory.

The monitoring system prints out events in their exact order of occurrence if the time difference is greater than a given magnitude. This resolution time applies to subsequent events up to and including the capacity of memory. In cases where the resolution time or the memory capacity is exceeded, the events will be printed out in a pre-determined numerical order. The occurrence and identification of an event, even momentary alarms, will not be lost. When all the information in the memory has been printed and any additional points which were not initially stored in a full memory have been identified by the printer, a "sequence terminate" code number is entered by the printer to indicate the end of a time related sequence of events.

There are also other modes of operation involving print-out which may be initiated by external controls. These include (a) off-normal summary mode when the printer prints all points in alarm, (b) test mode where each point is triggered into alarm and return to normal conditions and the printer operates to list these events in the normal manner and (c) failure analysis mode where an indicator identifies a faulty point card which has failed to transmit an interrogation or return to normal event is not signaled by the card.

These and other features and advantages of the invention will become apparent upon making reference to the specification to follow, the claims and the drawings wherein:

FIG. 1 is a box diagram illustrating an exemplary monitoring system incorporating the various features of the present invention;

FIG. 2a is a logic diagram of the point cards forming part of the system of FIG. 1;

FIG. 2b is a table illustrating the states of the bistable circuits on a point card under different operating conditions of the system;

FIG. 2c illustrates three important control waveforms present in the circuit of FIGS. 2a and 2b;

FIGS. 3a through 3h are exemplary circuit diagrams and their corresponding symbolic forms of various basic logic circuit components used in many of the circuit diagrams of FIGS. 4–40;

FIG. 6 is a circuit diagram of the exemplary point card bistable circuits shown in FIG. 2a;

FIG. 7 is a circuit diagram of the input-output gating utilized with the point cards;

FIG. 8 is a circuit diagram showing the input filter and inverter circuit utilized with each point card;

FIG. 9 is a detailed box diagram of an exemplary memory circuit used in the system of FIG. 1;

FIG. 10 is a circuit diagram of an exemplary decimal to binary converter used in the system of FIG. 1;

FIG. 11 is a circuit diagram of a divide by 10 and a divide by 16 circuit utilized in the delay counter of FIG. 12;

FIG. 12 is a block diagram of an exemplary delay counter used in the system of FIG. 1;

FIG. 13 is a circuit diagram of an exemplary "A" commutator used in the system of FIG. 1;

FIG. 14 is a circuit diagram of an exemplary clock and calendar circuit used in the system of FIG. 1;

FIG. 16 is a circuit diagram of an exemplary pulse shaper circuit used in the clock and calendar circuit;

FIG. 17 is a circuit diagram of an exemplary divide by 60 counter utilized in the clock and calendar circuit;

FIG. 18 is a circuit diagram of an exemplary counter used as the seconds and minutes counter in the clock and calendar circuit;

FIG. 20 is a circuit diagram of an exemplary AM-PM bistable circuit used in the clock and calendar circuit;

FIG. 21 is a circuit diagram of an exemplary days counter used in the clock and calendar circuit;

FIG. 22 is a chart illustrating the various states of the bistable circuit in the days counter of FIG. 21;

FIG. 23 illustrates the days counter reset logic used in the exemplary clock and calendar circuit;

FIG. 24 shows the special functions generator circuit associated with the exemplary months counter of the calendar and clock circuit;

FIG. 25 is a circuit diagram of an exemplary "Y" commutator used in the system of FIG. 1;

FIG. 26 is a circuit diagram of an exemplary "X" commutator used in the system of FIG. 1;

FIG. 27 is a circuit diagram of an exemplary output gate circuit for one word of memory in the system of FIG. 1;

FIG. 28 is a circuit diagram of an exemplary calendar output gating circuit used in the system of FIG. 1;

FIG. 29 is a circuit diagram of an exemplary clock output gating circuit used in the system of FIG. 1;

FIG. 30 is a circuit diagram of an exemplary mode gating circuit used in the system of FIG. 1;

FIG. 31 is a circuit diagram of an exemplary mode identification and print gating circuit used in the system of FIG. 1;

FIG. 33 is a circuit diagram of an exemplary print amplifier used in the system of FIG. 1;

FIG. 35 is a circuit diagram of an exemplary Y set control circuit used in the system of FIG. 1;

FIG. 36 is a circuit diagram of an exemplary output control circuit used in the system of FIG. 1;

FIG. 37 is a circuit diagram of an exemplary equation generator control circuit used in the system of FIG. 1;

FIG. 38 is a circuit diagram of an exemplary reset control circuit used in the system of FIG. 1;

FIG. 39 is a circuit diagram of an exemplary point swamp test and summary control circuit used in the system of FIG. 1; and FIG. 40 is a circuit diagram of an exemplary interrogation lockup and analysis control circuit used in the system of FIG. 1.

BASIC OR GENERAL DESCRIPTION

Figure 2D:
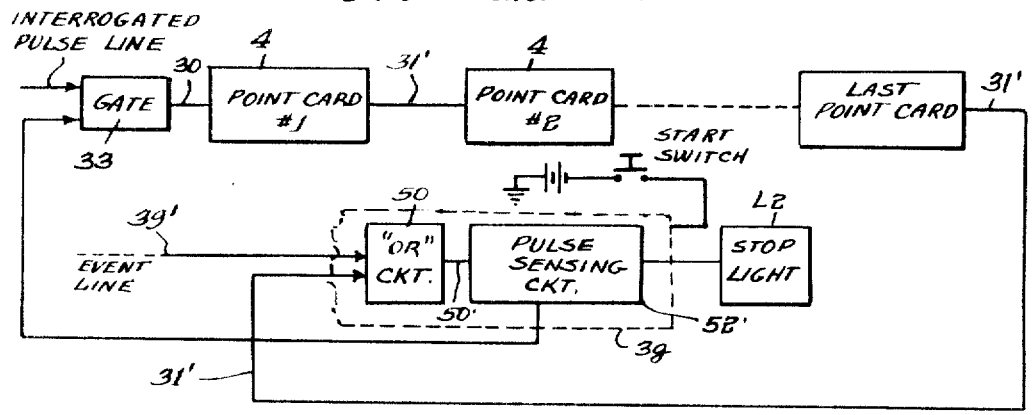
FIG. 2d is a simplified box diagram illustrating the logic of the "error lockup" mode of operation of the present invention.

A block diagram of an exemplary monitoring system incorporating various aspects or features of the present invention is shown in FIG. 1. A master clock 2 sets the basic timing of the system. A storage unit or memory 5 is provided having a number of storage levels each of which stores information on a variable which has just become abnormal or has returned to normal until all the information is fed to a printer 18 and printed out. The information on each variable includes information on whether the variable is abnormal or has returned to normal, a number identifying the time the particular variable became abnormal or returned to normal since the first variable in a sequence of events printed out, and a number identifying the particular variable involved. In the exemplary embodiment of the invention to be described, the memory 5 has ten storage levels for storing information on ten variables.

The master clock generates a number of signals, one being an interrogation pulse signal (Pi), another being a swamp pulse signal (Ps) and the third being a reset pulse signal (Pr) as shown in FIG. 2c. The interrogation pulse signal Pi is fed to the interrogation lockup and analysis control section 3g which, among other things, controls the feeding of the interrogation signal to the input of the point cards 4. Individual field contacts associated with the various variables are connected respectively to different point cards in a manner to be described. The opening and closing of the field contacts respectively indicate the normal and abnormal conditions of the associated variables. In a manner to be explained, an interrogation pulse fed to the point cards proceeds serially through all the point cards if the variables associated with the cards are in normal, or acknowledged alarm or acknowledged return to normal conditions. If an interrogation pulse reaches a point card with a variable that has just become abnormal or has returned to normal (i.e., an unacknowledged abnormal or return to normal condition) the interrogation pulse is sidetracked and effects pulsing of a selected group of lines or busses 6 which form a code identifying the number of the point card or variable involved. Also, in the case where the variable is an abnormal variable, the point card sends a pulse to an alarm bus 6'. The point card is then set to an acknowledged state where it will pass the next interrogation pulse to the next point card. The cyclic feeding of an interrogation pulse to the point cards normally continues unless an interrogation pulse fails to pass through a point card. Then the system operates in an error lockup mode to be described.

During the time the interrogation pulses are being fed through the point cards, it is desirable to make the point cards insensitive to changes in the condition of the field contacts to avoid the almost simultaneous feeding of an interrogation pulse to the code bus outputs of two point cards. Such a result would provide an erroneous and ambiguous combination of signals on the code busses which would fail to identify the point cards involved. To this end, the swamp pulse signal output of the master clock 2 is fed through a point swamp test and summary control circuit 3f which feeds a swamp pulse to each point card while an interrogation pulse is proceeding therethrough, to prevent the point cards from responding to the field contacts. The previous condition of the field contacts are, however, memorized by control elements to be described within each point card.

The signals on the code busses 6 are, in the exemplary embodiment of the invention, decimal coded and these signals are fed to a decimal to binary converter 7 which provides an output 7' which is a binary coded signal. The signal output of the decimal to binary converter 7 and the alarm bus 6' are fed to the input of the memory 5 which includes gates to be described which gate this information on the identification of the variable and its condition into one of the levels of the memory.

The signals appearing at the input to the code busses 6 are used to derive a signal fed to an information enter control circuit 3a which carries out a number of functions to be described in connection with various elements of the monitoring system. One of the functions carried out by this circuit is the energization of a new print lamp L1 when a new event or series of new abnormal or return to normal events occur. The energized lamp L1 attracts the operator's attention to the printer 18 which has or will print information identifying the variables involved and their conditions. After noting the condition of the variables, the operator depresses an acknowledgment switch which deenergize the new print lamp.

Upon the occurrence of a first abnormal or return to normal event in a related sequence of events, a delay counter 8 starts counting time so that a measure of time between the first event and subsequent events in a series can be indicated. The output of the delay counter 8 is fed to the input of the memory 5 and is read into a selected level of memory when the gates of the memory allow such information to enter the memory.

The particular level of memory which is filled at a given instance is determined by a control circuit referred to as the "A" commutator 10. This commutator may be a shift register or stepping switch having preferably one more stage or switch position than the number of levels in the memory 5. As each level of the memory 5 is filled with information, the "A" commutator 10 advances one stage or position to enable information on the next interrogated point indicating an unacknowledged abnormal or return to normal variable to enter the next level thereof. The order in which this information is stored in the memory 5 is thus normally an indication of the order in which the variables involved went abnormal or returned to normal if the spacing between these events is greater than the resolution time of the system. When the memory 5 is completely filled, the "A" commutator 10 will be in its last condition or position which indicates that the memory 5 has been filled.

The information stored in the memory 5 is fed through an output gate circuit 14, a binary to decimal converter 16 and printer drivers 17 to printer 18. Information is fed from the memory 5 in the same order in which the information was initially fed to the memory 5, so that there is a permanent record made of the order in which the variables become abnormal or returned to normal. The control exercised over the output gate circuit 14 determines the level and, in the preferred form of the invention where the printer prints one digit at a time the particular type of information in a given level fed to the binary to decimal converter 16 at a given instant of time. The output gate circuit 14 is controlled by a "X" commutator 22 which determines which type of information is fed from a selected level of the memory and a "Y" commutator 24 which selects the level of memory to be fed to the binary to decimal converter 16. The level selection "Y" commutator 24 may be a shift register or stepping switch which preferably has one more stage or position than the number of levels in the memory 5, as in the case of the "A" commutator 10. When the memory 5 is filled, the "A" commutator will be in its last position indicating that the last level of a memory has been filled. At this time, the feeding of the interrogation pulses to the point cards is terminated.

If a subsequent abnormal or return to normal event occurs before all of the information in the various levels of the filled memory 5 have been fed to the printer, then this new event will merely result in the triggering of memory bistable elements in the associated point card whose interrogation is inhibited until the memory is cleared. In such case, when the "Y" commutator has completed effecting the feeding of the information in the highest level of the memory 5 to the printer, the "Y" commutator is shifted into its last condition or position, whereupon all the commutators are reset and various control circuits to be described will effect the clearing of the memory 5, and the re-establishment of the feeding of the interrogation pulses to the point cards 4. The memory will then begin to fill up with information on the variables which became abnormal or returned to normal when the capacity of the memory 5 was exceeded, but the order of feeding of this information to the memory is dependent on the numerical order of the point card rather than the order in which the events involved took place. The information printed out by the printer on the latter variables are indicated by a number (such as 9.99) in what will be sometimes referred to as the sequence number position of the printout format. (A number in this position less than 9.99 indicates the time duration between the first event in a sequence of events and the time of occurrence of the event involved.)

After information on all of the variables which have become normal or abnormal in a given sequence have been printed out on the printer, the system is reset so that it can indicate a new sequence of events. At the beginning of each sequence of events, the printer 18 most advantageously prints the actual clock time at which the information on the first variable of the sequence was printed out. To this end, a clock and calendar circuit 19 is provided which indicates time in hours, minutes and seconds. This circuit also indicates date information in years, months and days. The clock and calendar circuit 19 is initially set to the proper time and date by means of control switches 20. Date information need not be printed for each sequence of events indicated on the printer 18, but may be printed at the option of the operator by depression of a demand date switch, shown next to the "Y" set control circuit 3b in FIG. 1. (or it may be automatically programmed so that it is printed out automatically at a preset time or times each day).

Up to now, the normal operating mode of the system has been outlined. As indicated in the introductory part of the specification, there are other modes of operation, namely test, analysis, off normal summary and error lockup modes of operation. The error lockup mode of operation of the system occurs when an interrogation pulse does not feed through a point card due, for example, to a defect in the circuitry of the point card. In such case, the interrogation lockup and analysis control circuit 3g will operate to prevent memory storage and printout operations and to energize a stop lamp L2 which indicates to the operator that there is a failure in the system. In the case where the defect is in a point card, the specific identification of the defective point card is determined merely by depression of an analysis switch.

Depression of the analysis switch results in the triggering of each operating point card into an unacknowledged alarm state just as if the associated variable just became abnormal (whether or not the variable involved is normal or abnormal). Point cards of variables in a currently acknowledged abnormal condition are reset to their normal state by extending the current swamp pulse which makes a reset pulse effective, and then operated to an alarm state again so that upon interrogation the alarm bus 6' will be pulsed as successive point cards receive interrogation pulses during successive operating cycles of the system. Pulsing of the alarm bus terminates when an interrogation pulse does not pass through a defective point card. As previously indicated, this condition terminates the feeding of interrogation pulses to the point cards. The alarm bus 6' will thus be pulsed a number of times dependent upon the number of successive point cards which are in an operating condition. One number higher than this will identify the defective point card. In a manner to be described, the pulses on the alarm bus 6' are directed to a counter preset to one, such as the delay counter 8, which will indicate the defective point card. After the defective point card is replaced by an operating point card, a start switch is depressed to start the system into normal operation again.

Another mode of operation is the test mode of operation wherein the entire operation of the system is tested upon depression of a test switch connected to the point swamp test and summary control circuit 3f which causes each and every point card to be operated in an unacknowledged alarm state in the same manner as described in connection with the analysis mode of operation. However, memory storage and printout operations are permitted to operate so that the printer 18 will print out information on each and every point as in a case where every variable simultaneously becomes abnormal. If the system is operating properly, the proper information will be printed by the printer.

Still another mode of operation of the system is the off normal summary mode of operation initiated by depression of a summary switch also connected with the point swamp test and summary control circuit 3f. Depression of this switch will effect only point cards of still abnormal variables by extending the swamp pulse fed to the point cards to render a reset pulse effective to return any point card in an alarm indicating state momentarily to a normal state which then returns to an unacknowledged alarm indicating state to effect the feeding of abnormal variable data to the memory 5 and subsequent printout thereof.

A number of other control circuits are provided which have not yet been mentioned, such as reset control circuits 3e which effects reset of various parts of the system, equation generator control circuit 3d, and output control circuit 3c which effects various control operations which are better referred to as this specification proceeds. A specific exemplary circuit for the various components shown in box form in FIG. 1 will be later described in connection with other figures of the drawings which disclose them. The various figures in the drawings which correspond with the various boxes in FIG. 1 have been indicated on FIG. 1.

The manner in which each of the modes of operation of the system affect the printout format of the printer 18 will now be described. In this connection, reference is made to the following printout format which represents information printed on a tape or strip by the printer 18 for the different modes of operation of the system.

FACSIMILE TAPE

| Example number | | |
|---|---|---|
| (1) | AM | 2.16: 32 |
| | A | 0.00:222* |
| | | 00: 00 |
| (2) | PM | 3.14: 06 |
| | N | 0.00:111 |
| | | 00: 00 |
| (3) | D | 11.19: 61 |
| | AM | 10.16: 32 |
| (4) | AM | 2.16: 32 |
| | A | 0.00:172* |
| | A | 0.03:163* |
| | A | 0.61:229* |
| | N | 2.52:178 |
| | | 00: 00 |
| (5) | PM | 3.14: 51 |
| | S | 0.00:264* |
| | S | 0.00:267* |
| | | 00: 00 |
| (6) | PM | 6.52: 27 |
| | T | 0.00: 01* |
| | T | 0.00: 01 |
| | T | 0.00: 02* |
| | T | 0.00: 02 |
| | | etc. |
| | T | 0.00:300* |
| | T | 0.00:300 |
| | | 00: 00 |
| (7) | PM | 7.12: 10 |
| | A | 0.00: 25* |
| | | etc. |
| | N | 2.54: 27 |
| | A | 9.99: 28* |
| | | 00: 00 |

* Printed in red.

As is conventional with strip printers, the printer automatically advances the paper tape one line after the printing of a limited amount of information.

Example #1 shows that an event occurred at 2 hours, 16 minutes and 32 seconds AM. This alarm point was #222 and it went into alarm at about the mentioned time. Please note that printout is in red-colored type signifying an alarm. The 00: 00 printout signifies that the printer has caught up to the information in the memory and the system has been cleared and reset.

Example #2 shows that an event occurred at 3 hours, 14 minutes and 6 seconds PM. This event was alarm point #111 and it returned to normal. The 00: 00 printout signifies that the printer has caught up to the information in the memory and the system has been cleared and reset.

Example #3 shows a date printout of the 11th month, 19th day and the year 1961, and a time printout of 10 hours, 16 minutes and 32 seconds AM (if this occurred at PM, the letters PM would be substituted in lieu of AM). Date and time printout occurs in one operation. It should be noted at this time that a time print always occurs whenever a first event occurs.

Example #4 shows three alarms occurring more than one millisecond apart. An event has occurred at 2 hours, 16 minutes and 32 seconds a.m. The next three entries show the chronological order of these events as follows:

Point #172 was the first to alarm at the above stated time. Point #163 alarmed 30 milliseconds later and Point #229 alarmed 610 milliseconds after the first alarm. Please note that the time interval of subsequent alarms is in units of 10 milliseconds, with a range of 9.99 seconds. For example, the next entry shows Point #178 returning to normal 2 seconds and 520 milliseconds later than the first alarm which began at 2 hours, 16 minutes and 32 seconds AM.

The 00:00 print-out signifies that the printer has caught up to the information in the memory and the system has been cleared and reset.

Example #5 shows an off-normal-summary. This particular example shows that at 3 hours, 14 minutes and 51 seconds PM, the operator pressed his off-normal-summary pushbutton and the printer recorded points #264 and #267 as being off-normal at that particular time. The letter S symbolizes "Summary."

Example #6 shows a full operational test which prints out all the points in the system in physical order, putting each point in the alarm state and returning it to normal. The letter T identifies this as a test. The red colored type signifies an alarm; black colored, a return to normal.

An automatic off-normal-summary will follow the test print-out.

Example #7 shows a series of events which exceed in number the storage capacity of the storage. The last point stored in the storage is point #27 which went abnormal 2 seconds and 540 milliseconds later than the first alarm (point 25). The next point to go abnormal was point 28. The 9.99 in the time section of the print-out format indicates that the alarm information was not fed to storage. The 9.99 has no time significance in terms of indicating the specific time the point went abnormal.

The logic (as distinguished from circuit details) used to accomplish the different modes of operation will now be described.

*Point card logic (FIG. 2A)*

In the preferred form of the invention there are four possible conditions of the field contacts that must be recognized:

normal—contact open; recorded
alarm—contact closed; not recorded
acknowledged—contact closed; recorded
return-to-normal—contact open; not recorded To express these four "states" two bistable circuits A and B (FIG. 2a) per point are employed as a basis for the logic. The different binary states of the two bistable circuits under the four possible conditions of the field contacts is shown in FIG. 2b. The two rectangular sections making each of the exemplary bistable circuits illustrated in FIG. 2a represent separate transistors or other current or voltage control devices which, in a given condition of the bistable circuit, have opposite conductive states, such as a relatively highly conductive and relatively non-conductive state. For purposes of illustration only, it will be assumed that when one of the control devices is in a relatively highly conductive state that its output will be zero or ground and when it is in a relatively non-conductive state its output will be a negative voltage. The left-hand control device of each bistable circuit is identified by a letter A or B and the right-hand control devices thereof is identified by $\overline{A}$ or $\overline{B}$. The outputs from the bistable circuits are shown extending from the upper portions of the bistable sections A, $\overline{A}$, B and $\overline{B}$ and control inputs which trigger the bistable circuits are shown extending to the sections from the sides thereof.

The interrogation pulses are first fed to the point card No. 1 on an input line 30 connected to a suitable gate circuit 31 on the point card. Normally, an interrogation pulse will pass through the gate circuit 31 to the input of the corresponding gate circuit 31 of the succeeding point card via a line 31'. When all points are normal, the interrogation pulse will thus proceed through the corresponding gates 31 of all the point cards which are in effect connected in series. When a particular variable becomes abnormal, its field contacts will open or close and will feed a trigger voltage to a monostable multivibrator circuit 32 of the associated point card to set the same into its unstable state. The time constant of the monostable circuit is adjusted so that it remains in its unstable state for a fixed period selected to be greater than the chattering period of the field contacts. The monostable circuit will remain in this unstable state (once it is triggered) independently of the position of the field contacts for a given period. If the field contacts remain in their abnormal position, the monostable circuit 32 will be held thereby in its unstable state, and upon return of the field contacts to a normal position, the monostable, will return to its normal or stable state. In effect, therefore, the monostable circuit 32 is insensitive to the vibrations of the field contacts.

As long as the monstable multivibrator circuit 32 remains in its unstable state, it will deliver, for example, a negative voltage on its output line 32' which extends to the control input of the "A" bistable circuit. The presence of a negative voltage on the line 32' will trigger the "A" bistable circuit from its normal or "1" state to its "0" state as shown in FIG. 2b. As is conventional with most bistable circuits, during successive setting and resetting of the bistable circuit one cycle of a square wave will be generated at each output of the bistable circuit, the square waves at the two outputs being 180° out of phase. These outputs may be fed to differentiating networks generally indicated by reference numeral 34 which are either part of the bistable circuit or separate therefrom. The circuits 34 provide pulses at the leading and trailing edges of the square wave outputs. The differentiating networks may be associated with both outputs of the "A" bistable circuit and one or more rectifiers 36 connected to a common output line 37, so that positive going pulses appear on the line 37 each time the bistable circuit switches state. These positive pulses are fed by line 37 to one of the control inputs of the "B" bistable circuit to trigger the "B" bistable circuit into a "1" state if the latter is initially in an "0" state.

The right-hand control device $\overline{B}$ of the "B" bistable circuit has an output line 33 extending to gate circuit 31 and in the "0" state of the bistable circuit keeps the gate 31 open. However, when the "B" bistable circuit is triggered to its "1" state, the voltage appearing on the output line 33 will change to close the gate circuit 31 to prevent passage of the interrogation pulse to the next point card. Instead, the interrogation signal will pass through another gate circuit 35 which is normally maintained in a closed state by a control line 38 extending to the output of the left-hand control device B of the "B" bistable circuit. When the "B" bistable circuit is triggered into its "1" state, the voltage on the line 38 will open the gate circuit 35 to pass a signal to output line 35' connected through various coding diodes 45 to the selected code busses 6 which identify in decimal form the number of the point card involved. The code busses 6 may be connected to an "or" circuit 39 which provides a signal on a common event line 39' indicating normally that a memory storage and printing operation is called for. (It should be understood that the use of the term "gate circuit" to describe circuit 35 as well as other gate circuits, is intended to apply not only to a circuit which acts simply like a switch which closes when a certain combination of input signals are present to feed an input pulse to the output involved, but also to circuits which are functionally analogous thereto which generate a modified signal. For example, such a modified signal could be the disappearance of a voltage or pulse at the output upon the presence of the input signals referred to.)

As soon as an interrogation signal appears on the output line 35', a resetting pulse, which may be obtained from the output of a differentiating network 35'' connected to line 35', is fed to the B control device of the "B" bistable circuit to reset the same to its "0" state. In so doing, the voltages fed by the gate control lines 33 and 38 are such that the gate circuit 35 will then be closed and the gate circuit 31 will then be open to allow passage of the interrogation pulse to the next point card. The point card bistables are then in an acknowledged alarm condition. The point card normally remains in this condition as long as the field contacts remain in their abnormal indicating position, for, in such case, the output of the monostable multivibrator circuit 32 will be continuously of a polarity to maintain the "1" state of the "A" bistable circuit.

Between the generation of successive interrogation pulses, a reset pulse P𝑟 is generated as shown in FIG. 2c. This reset pulse is applied to the "A" bistable circuit by a reset line 40. The reset pulse will be normally ineffective to reset the "A" bistable circuit until the associated field contacts return to their normal indicating position, which will allow the monostable circuit 32 to return to its stable condition, thereby changing the output voltage on the output line 32'. (The reset pulse is also ineffective when the B̄ control device of the "B" bistable circuit is non-conductive due to a reset inhibit branch circuit 41 between the B̄ output of the "B" bistable circuit and the reset input line 40.) The exception to this is when the swamp pulse P𝑎 on an input line 42 is extended in duration to block the effect of the voltage output of the monostable circuit 32. In such case, the reset pulse is effective to reset the "A" bistable circuit independently of the condition of the field contacts. In the case where the "A" bistable circuit is reset upon return of the field contacts to their normal indicating position, a positive going pulse will be fed to the B̄ control device of the "B" bistable circuit on line 37 to trigger it into a "1" state once again. In such case, the gate circuit 31 will again become closed and the gate circuit 35 will again become opened to pass a signal to the code busses 6 and the event line 39' to effect entry of information into the memory 5 as previously described.

As previously indicated, it is necessary to distinguish in the printout format a condition where the variable has just become abnormal from one where the variable has just returned to normal. This is most conveniently achieved by a gate circuit 43 having input control lines 43a and 43b connected to the outputs of the left-hand control devices of these circuits and an input line 43c connected to the interrogation pulse output line 30. A signal will appear on the gate output line 43' coincident with an interrogation pulse whenever the A and B control devices of the "A" and "B" bistable circuits are respectively in a highly conductive state (i.e. when the associated variable becomes abnormal). The output of the gate circuit 43 of each point card may be fed through a diode 44 to the alarm bus 6' whenever a new abnormal variable indicating signal appears at the output of any of the point card gate circuits 43.

As previously indicated, during the passage of the interrogation pulses through one or more point cards, it is undesirable to allow a change of condition of the field contacts to affect the condition of the point cards. Otherwise, it would be possible for an interrogation pulse to pass through the gate circuits 35 of two point cards if the field contacts of the point card ahead of a point card associated with an unacknowledged event were to change position in the middle of the generation of an interrogation pulse. This would result in the code busses receiving signals almost simultaneously from two point cards which would produce erroneous point identification information. Accordingly, the swamp pulses P𝑎 fed on the lines 42 are normally generated to encompass the periods during which the interrogation pulses are passing through the point cards, the swamp pulses inhibiting the effect of the output voltage of the monostable circuit 32 on the associated "A" bistable circuits. The "A" bistable circuits memorize the previous conditions of the associated field contacts until they are reset.

*Error lockup operation logic—simplified (FIG. 2d)*

Refer now to FIG. 2d which illustrates a simplified logic diagram of the error lockup mode of operation of the system. As previously indicated, each of the point cards has an output line 31' at which the interrogation pulse appears if the associated variable has not recently become abnormal or returned to normal, and an output line 35' at which a signal appears when the associated variable becomes abnormal or returns to normal. The output line 31' of the last point card in the group of point cards connected in series (by their output lines 31') is connected to an "or" circuit 50. Also, the event line 39 is connected to the "or" circuit 50. The presence of an interrogation pulse on any one of the latter line 31' or 39 will result in the generation of a signal on an output line 50' of the "or" circuit 50.

The line 50' is connected to a suitable pulse sensing circuit 52' which, upon the detection of the absence of a pulse (such absence normally indicating that an interrogation pulse has not fed through a defective point card) energizes the stop lamp L2 which indiactes to the operator that something is wrong in the system. Also, a gate 53 controlling the feeding of the interrogation pulses to the point cards is closed, to stop the operation of the system. To locate the source of the trouble, the operator will then depress the analysis switch shown in FIG. 2e to which reference is now made.

*Self analysis operation logic—simplified (FIG. 2c)*

Depression of the analysis switch feeds a signal to a control circuit forming part of the interrogation, lockup and analysis circuit 3g. One of the functions of this control circuit effect closing of gates associated with the memory 5 to stop the feeding of information to and from the memory so that the printer 18 will not operate and memory will not fill up with useless information. This is accomplished by closing a gate circuit 56 which inhibits the effect of the pulses on the event line. Also, depression of the analysis switch feeds a signal through a decoupling rectifier 58 to the ungrounded side of the test switch so that depression of the analysis switch will carry out some of the functions carried out by depression of the test switch. Among these functions are the pulsing of a test bus through a gate circuit 62 connected to a source of negative voltage 63 (FIG. 2a) which applies an artificial abnormal variable indicating signal to the inputs of all the "A" bistable circuits. Another function is the operation of a swamp pulse extending circuit 64 forming part of the point swamp test and summary control circuit 3f to extend the swamp for one cycle so that all "A" bistable circuits associated with abnormal variables will be reset momentarily and then set to an alarm state by the resulting signal on the test bus. (Momentary depression of a pushbutton switch lasts many operating cycles of the system.) Since all of the point cards are in an alarm state, the point cards in order of their position will generate a pulse each cycle on the alarm bus 6' as an interrogation pulse appears at the input of a gate circuit 43 (FIG. 2a) of an interrogated point card. The pulses appearing in the alarm bus 6' will terminate when a defective point card is interrogated. The pulses appearing on the alarm bus 6' are fed to a suitable counter, which in the exemplary form of the invention being described is the delay counter 8 preset to the number 1. In this case, the normal clock pulse input fed to the delay counter 8 through a gate circuit 61 is inhibited by signals derived from the interrogation lockup and analysis control circuit when the analysis switch is depressed. The defective interrogated point card does not feed a signal to the "or" circuit 50 in FIG. 2d. As explained in connection with FIG. 2e, the interrogation pulse input gate 53 is closed terminating the pulsing of the alarm bus 6' and the interrogation of the point cards. Since the counter 8 was preset to one during the analysis mode of operation, the number stored in the counter 8 identifies the point card which is defective. The counter 8, as previously indicated, controls analysis lamps L3 which indicates the number stored in the counter 8.

To restart the system into operation, the start switch is depressed, which removes the lockout of the system by, among other things, opening the gate 53 allowing the interrogation pulses once again to interrogate the point cards.

Figure 2E:
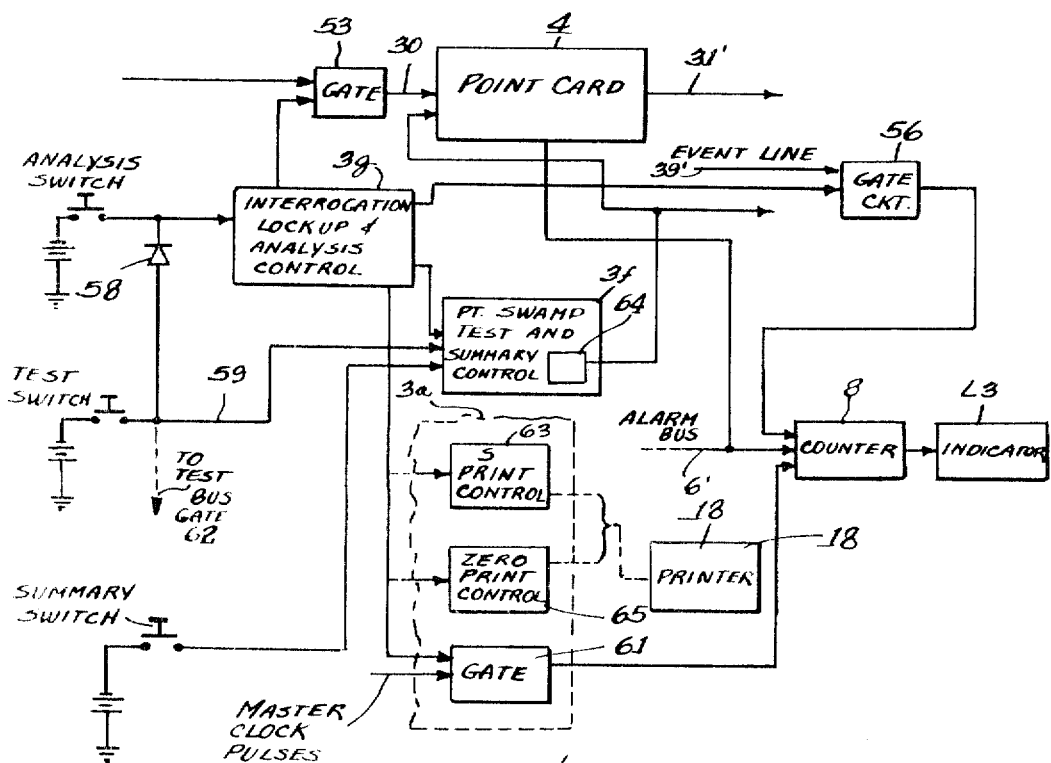
FIG. 2e is a simplified box diagram illustrating the logic of the test, analysis and off normal summary modes of operation of the present invention.

Off normal summary operation logic—simplified (FIG. 2e)

The off normal summary mode of operation of the system of the invention is initiated by depression of the off normal summary switch. This switch operates the swamp pulse extending portion of the point swamp test and summary control circuit 3f, so that the point cards associated with still abnormal variables will be reset momentarily and then re-alarmed as explained above. The memory and print operations of the system are effective for the off normal summary mode of operation so that information on abnormal variables will be fed to memory and printed out. To distinguish an off normal summary print-out from other print-outs, as previously indicated, the letter "S" is typed at the beginning of each print-out format, and instead of a delay count number, the number 0.00 is printed. The means for effecting the "S" and the "0" print-out are indicated in FIG. 2e by boxes 63 and 65, respectively forming part of the information enter control circuit 3a. The zero print control may perform, for example, as a count inhibit operation which prevents the delay counter 8 from counting so that it registers zero.

Now that the basic operation of the system has been briefly outlined, the exemplary circuits which carry out the various functions described previously will now be described.

Input filter and inverter circuit (FIG. 8)

Refer now to FIG. 8 where there is shown the input circuitry which connects a set of normally open or normally closed field contacts to the input of the "A" bistable circuit of the associated point card. A filter circuit 74 is provided at the input of the rectifier 70 to filter out unwanted noise components which may otherwise trigger the bistable circuit. Upon closure of a set of normally open field contacts, a negative voltage is applied through a rectifier 70 to the base electrode 72 of a left-hand PNP transistor of the monostable multivibrator circuit 32 to render the same conductive. When the field contacts are open, the left-hand transistor is non-conductive and the right-hand transistor is conductive. When the base electrode of the left-hand transistor is driven negative by closure of the field contacts, the monostable circuit is triggered into a quasi-unstable condition where the left-hand transistor is in a conductive condition and the right-hand transistor is in a non-conductive condition due to a feedback circuit including a capacitor C5 coupled between the collector electrode of the right-hand transistor and the base electrode of the left-hand transistor. The time constant of the circuit shown is such that the unstable condition of the monostable circuit will last a sufficient time to enable any chattering of the field contacts to disappear. At the end of this period, if the field contacts are still closed, the monostable circuit will be maintained in its unstable state by the closed field contacts and if they are open the left-hand transistor will return to a non-conductive state and the right-hand transistor to a conductive state.

Where normally closed field contacts are utilized, the normal closure of the contacts will feed a negative voltage to the left-hand transistor to keep the latter in a conductive state which causes the right-hand transistor to be in a non-conductive state. Opening of the field contacts will reverse the conductive states of the transistors which will be maintained at least as long as the time constant of the capacitor feedback circuit keeps the voltage of the base electrode of the left-hand transistor positive. When the capacitor is substantially fully charged to the new voltage condition, the circuit is solely under control of the field contacts, so the left-hand transistor will then be non-conductive if the field contacts are then open or conductive if the field contacts are closed.

When operating with normally closed field contacts the output of the monostable circuit is taken on a line 73 connected to the collector electrode of the left-hand transistor which has a positive going voltage when the field contacts close due to a normal variable. The output line 73 extends to a jumper terminal 77 which is connected by a jumper wire 75 to another jumper terminal 79. A rectifier 81 is connected to a jumper terminal 79. Normally, the rectifier is conductive to feed a ground clamping potential to the input terminal 29 of the "A" bistable circuit of FIG. 6. When a negative voltage is fed to the rectifier 81 from the output of the monostable circuit 32, the rectifier is rendered non-conductive which effects the feeding of a negative voltage to the input to the "A" bistable circuit. When using normally open field contacts, an output line 83 connected to the collector electrode of the right-hand transistor is utilized to couple ground potential when the normally open contacts open indicating a normal variable. The line 83 extends to a jumper terminal 84 to which a jumper 86 is connected when operating with normally open field contacts. The opposite end of the latter jumper connects to the jumper terminal 79. Thus, when the normally closed field contact open, the rectifier 81 is rendered non-conductive as when the normally open field contacts close.

Point card bistable circuitry (FIG. 6)

In the bistable circuitry of FIG. 6, the "1" state of the "A" and "B" bistable circuit is indicated by a negative voltage on the collector electrode of the right-hand transistor and ground on the collector electrode of the left-hand transistor. The collector output of each left-hand transistor is referred to as output A or B and the collector output of each right-hand transistor is referred to as output $\overline{A}$ or $\overline{B}$. The ability of any point card to remain in a "normal" state is dependent on two independent variables, the current through input resistors R9 or R10 associated with the "A" bistable circuit connected respectively to input point 29 and test input terminal 26. These are direct current (D.C.) inputs to the "A" bistable circuit and a negative voltage applied to the D.C. input of either normally causes a shift in state when the transistor involved is non-conductive. During the normal state, however, the test input terminal 26 is open circuited, a swamp input terminal 27 is pulsed with waveform P$a$, which varies between a negative (6.3) volts and ground and input point 29 is clamped to ground by rectifier 81 (FIG. 8). The swamp pulse at terminal 27 clamps the input point 29 to ground during 700 microseconds out of each millisecond (see FIG. 5 for the precise relationships of the timing pulses). This allows the latter terminal to go negative when the field contacts are in their abnormal indicating condition, only during the following 300 microseconds that the clamping voltage disappears. Thus, information from the field contacts is inhibited during interrogation of the points, and interrogation takes place during the 700 microseconds that the field contact signal is swamped out. Reset input terminal 33 is continuously pulsed with $\overline{P}_r$ pulses, but this has no effect on a point in the normal state.

An alarm state exists from the time the "A" bistable circuit switches to the "1" state until the system control has initially interrogated and acknowledged the alarm.

Assuming a variable goes abnormal, current is drawn out of the base of transistor T2 of the "A" bistable circuit through resistor R9 during the time that the input point 27 is not clamped to ground by swamp signal $\overline{P}_s$. This saturates transistor T2 and forces its collector to ground. As the collector voltage moves toward ground, the current flowing from the base of the other bistable transistor T3 through resistor R16 is stopped. Transistor T3 is thus cut off and its collector falls to a negative potential. Transistor T2 is held conducting regardless of the current through resistor R9, because resistor R15 now serves as a sink for its base current. The "A" bistable circuit is now in the "1" state. As the collector of transistor T2 rises from a minus voltage to ground, the resulting positive going voltage change is transmitted through capacitor C7 and rectifier D10 to the base of transistor T8. Transistor T8 is immediately switched off and, as its collector voltage falls to a negative voltage, current is drawn from resistor R42 turning on transistor T7. The "B" bistable circuit is now in the "1" state.

The voltage division between resistors R18 and R19 holds point 36 at a voltage more negative than —6.3 volts. This insures that point 36 will not rise above ground when the reset terminal 33 is pulsed with signal $\overline{P}_r$. If this were permitted rectifier D4 would conduct and the "A" bistable circuit would change back to the "0" state. Signal $\overline{P}_r$, therefore, has no effect during the "alarm" state.

The potential at an input terminal 46 to the "B" bistable circuit remains at ground until an acknowledgement pulse coincident with an interrogation pulse reaches the point card involved. This acknowledgement pulse is applied through a point identification nor gate to be described to terminal 46. The trailing edge of this pulse is positive going, and the resulting voltage change is transmitted across capacitor C5 and rectifier D9 to the base of transistor T7. The "B" bistable circuit then switches to the "0" state and the point enters what is called the "acknowledged" state. The "acknowledged" state exists from the time an alarm is acknowledged until the field contacts return to their normal position and the next reset signal $\overline{P}_r$ comes along.

Input point 27 remains negative during the 300 microseconds the swamp pulse $\overline{P}_s$ is not present as long as the field contacts remain in their abnormal indicating position. When the field contacts return to their normal position, however, point 29 is grounded, and point 36 rises toward ground (capacitor C2 is charged up through resistor R18). The next $\overline{P}_r$ pulse to come along forces point 36 to 6.3 volts positive, and this voltage "spike" is transmitted through rectifier D4 to the base of transistor T2. Transistor T2 is immediately cut off and transistor T3 is forced to conduct. As the output at $\overline{A}$ rises from a minus voltage to ground, a positive going change in voltage is transmitted through capacitor C6 and rectifier D8 to the base of transistor T8. The "B" bistable circuit is thus switched to the "1" state with a positive pulse in exactly the same way as the "A" bistable circuit was switched to the "0" state with reset pulse $\overline{P}_r$. The point is now in the "return-to-normal" state.

When an interrogation pulse reaches a point card in the "return-to-normal" state, this pulse is applied to terminal 46. The trailing edge of interrogation pulse $\overline{P}_i$ is positive going, and this change in voltage is applied to the base electrode of transistor T7 through capacitor C5 and rectifier D9. The "B" bistable circuit is thus switched from a "1" to a "0" state and the point card is again in the normal state. The return-to-normal state exists only from the time pulse $\overline{P}_r$ is successful in resetting the "A" bistable circuit to the time the point is interrogated.

*Input-output gating logic (FIG. 7)*

As previously indicated, this logic consists of four transistor nor gate circuits shown in FIG. 7. The gate circuits are used to recognize which state the point is in and to provide the appropriate output whenever an interrogation pulse $\overline{P}_i$ is applied. If the point is in the alarm or the return-to-normal state, the code or P.I.D. busses 6 must be pulsed whenever an interrogation pulse comes along. In addition, the interrogation pulse to the next point must be blocked, so that the next point will not be interrogated. When a point is found to be in the alarm state, the alarm bus 6' must also be pulsed, so that the central control logic can distinguish between an alarm and a return-to-normal. During the "normal" and "acknowledged" states the interrogation pulse must not be interrupted; it must be passed on to the next point. In addition, the point code and alarm busses must be blocked.

A nor gate presents at its output an "and" function of the negations of its inputs. For example, if two functions X and Y were used as inputs to a nor gate, the output would be $\overline{X}\overline{Y}$.

Boolean equation can be written expressing the desired outputs from the point logic as follows:

$P_1$ TO THE NEXT POINT $$f1 = P_1 AB + P_1 \overline{A}B$$
$$f1 = P_1 B(A + \overline{A}) = P_1 B$$

P.I.D. BUS 6

$$f2 = P_1 \overline{A}\overline{B} + P_1 A\overline{B}$$
$$f2 = P_1 \overline{B}(A + \overline{A}) = P_1 \overline{B}$$

ALARM BUS 6'

$$f3 = P_1 \overline{A}\overline{B}$$

The above results can be checked by referring to the table of FIG. 2b, which shows the states of the two bistables for any of the four point conditions. As shown in FIG. 7, the three functions expressed above are made up as outputs from the gate circuit 31, the nor gate circuit 35, and the alarm nor gate circuit 39. The interrogate signal $\overline{P}_i$ is the function that is applied as an input to each of these nor gate circuits, and so an inverter circuit is used to invert and amplify the interrogate signal $P_i$ received from the previous point.

The nor gate circuits 31, 35 and 39 represent standard circuits, and no attempt will be made to explain the electrical function of each component except to state that the diode and capacitor network D7 and C4 are used on the all clear nor gate circuit 31 to represent a means of speeding up the response of the output function. Delay encountered here is of special importance because the interrogation pulse must be propagated through up to 1000 points in less than 600 microseconds.

*Basic logic components*
*(FIGS. 3a through 3h)*

Most of the figures now to be described utilize boxes or other symbolic representations to indicate the different basic logic components shown therein. These symbols are representations together with exemplary circuit diagrams therefor shown in FIGS. 3a through 3h.

The "nor" gate circuit shown in FIG. 3a is a more or less conventional gate circuit wherein a number of inputs extend to the base electrode of a PNP transistor connected so that the transistor is conductive when anyone of the inputs has a negative voltage and is non-conductive when all of the inputs are at ground (or a positive voltage). The circuit of FIG. 3b is similar to the circuit of FIG. 3a except that an additional output is provided extending through a rectifier 87 coupled to the collector electrode of the transistor. This circuit is called a "nor-or" gate circuit because the output including the rectifier may be connected to a common point together with the rectifiers of other similar circuits to form an "or" connection.

FIG. 3c shows a "nor common load" gate circuit which is similar to the "nor" circuit of FIG. 1 except that a load connection of the collector electrode is omitted. A number of "nor common load" circuits may be connected to a common load resistor extending to the negative terminal of a source of direct current voltage to complete the circuit.

FIGS. 3d and 3e show flip-flop and memory bistable circuits used in various fiigures to be described. These circuits are more or less conventional type bistable circuits provided with three different types of inputs. One type of input (C, D, S or R) is a direct current (D.C.) signal input which in its symbolic form extends into the side of the rectangle representing the circuit and terminates in a dot. The second type of input (G, H or I) is referred to as an A.C. input at which an alternating current or pulsed input appears. The third type of input is an inhibit input (E, F or I) which is represented by a line extending to a semi-circle. A negative voltage fed to an inhibit input will inhibit a negative pulse fed to the contiguous A.C. input.

FIG. 3f shows emitter follower circuit; FIG. 3g shows an "or" connection utilizing a series of rectifiers connected to the same end of a common load resistor R1. FIG. 3h is a pulse generator circuit having an inhibit input B associated with a line terminating in a semi-circle.

Figure 4:
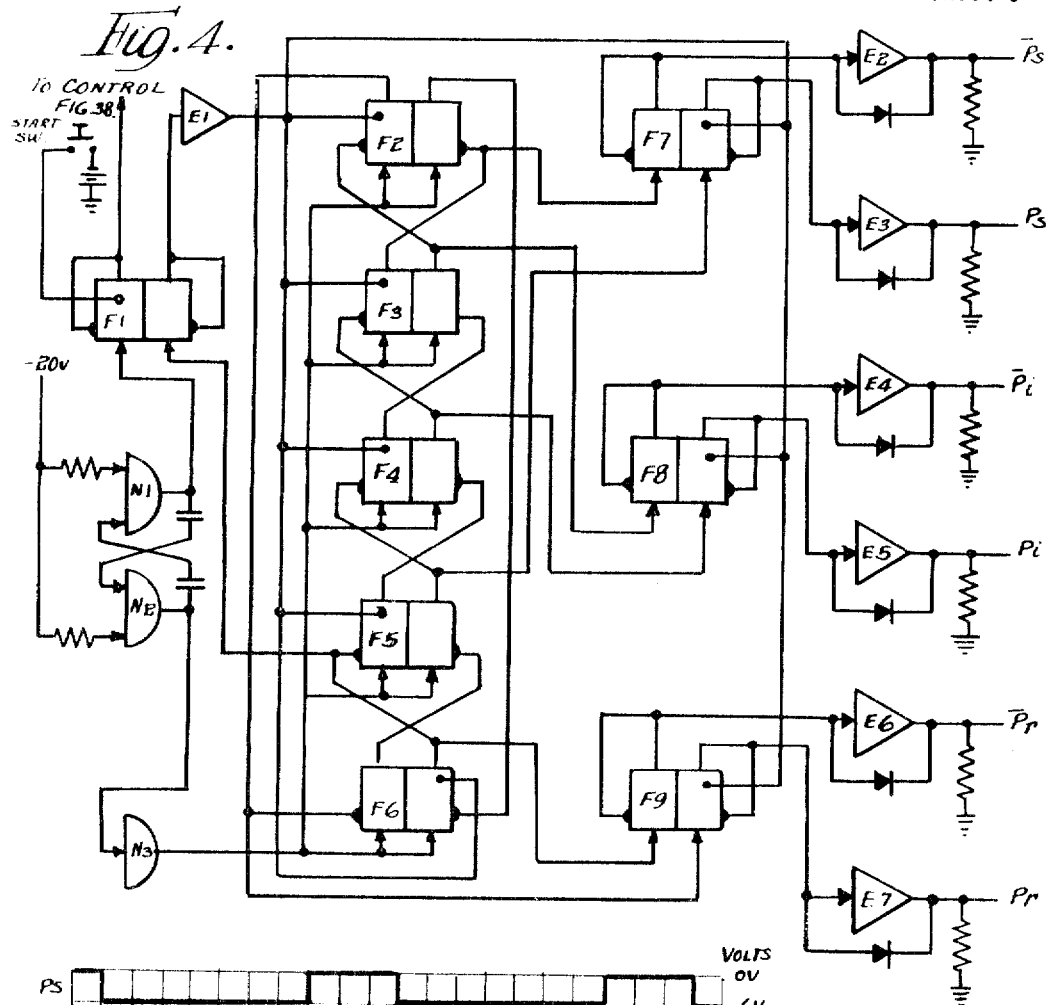
FIG. 4 is a circuit diagram of an exemplary master clock used in the system of FIG. 1.

Master clock (FIG. 4)

FIG. 4 is the logical representation of the master clock, which is composed of NOR'S N1 and N2 interconnected to form a 10 kc. stable multivibrator, feeding five flip-flops connected as a shift register that counts in the following manner:

| F2 | F3 | F4 | F5 | F6 | $T_1$ | |
|----|----|----|----|----|----|----|
| 0 | 1 | 1 | 1 | 1 | 0 10 | The $t_i$'s refer to the reference time zones shown in Fig. 4 and occur at the change of state of the master clock. |
| 0 | 0 | 1 | 1 | 1 | 1 11 | |
| 0 | 0 | 0 | 1 | 1 | 2 12 | |
| 0 | 0 | 0 | 0 | 1 | 3 13 | |
| 0 | 0 | 0 | 0 | 0 | 4 14 | |
| 1 | 0 | 0 | 0 | 0 | 5 15 | |
| 1 | 1 | 0 | 0 | 0 | 6 16 | |
| 1 | 1 | 1 | 0 | 0 | 7 17 | |
| 1 | 1 | 1 | 1 | 0 | 8 18 | |
| 1 | 1 | 1 | 1 | 1 | 9 19 | |

Thus, the register cycles at a 1 kc. rate.

The function of nor N3 is to shape and to provide drive for the output of the miltivibrator.

The appropriate outputs of the register are connected to the inputs of three flip-flops as shown in FIG. 3 to produce the three basic control pulses ($P_i$, $P_s$, and $P_r$) of the system and their inverses. These pulses are shown in FIG. 4.

The emitter followers in FIG. 3 are used to provide sufficient drive for the system. The diodes between the bases and emitters of these circuits are to provide a discharge path for capacitors when the emitter followers drive differentiating circuits.

Flip-flop F1 provides a safety reset for the master clock to insure that it counts in the proper manner. The output of F1 to control section E will be described later.

Note that $P_1$ occurs during and near the beginning of $P_s$ and that $P_r$ occurs during $\overline{P}_s$. The purpose of the timing will be made clear when we discuss the control of the point cards.

Memory (FIG. 9)

Before discussing how the information flow from the point cards to the memory is controlled, let us look at the memory itself (FIG. 9).

The memory element is a memory bistable (see FIG. 2e). Each word in the memory represents a three decimal digit point identification, a three decimal digit delay time, and a single bit representing the state of the recorded event. Since each decimal digit requires four binary bits in the 1–2–4–8 code to represent it, the memory word contains 25 binary bits. The standard system has a ten word memory and, therefore, has a 250 bit memory. Lets consider the memory as arranged in a rectangular array, 25 horizontal by 10 vertical. Each memory element will be identified by the term $M_{ij}$, where $i$ identifies the word and $j$ identifies the bit function.

Information is fed into the memory bit through the set input (S terminal, FIG. 2e). Each column of memory has its set inputs tied together. The inhibit inputs (I terminal, FIG. 2e) of each row are tied together, and are used to allow information to enter only one level of memory at a time. The proper level is selected by the "A" commutator which will be described later.

The memory can be considered as being ordered in the following manner:

$M_{i1}$—alarm or normal
$M_{i2}$–$M_{i5}$—time delay (seconds)
$M_{i10}$–$M_{i13}$—time delay ($10^{-2}$ seconds)
$M_{i10}$–$M_{i13}$—time delay ($10^{-2}$ seconds)
$M_{i14}$–$M_{i17}$—point identification (hundreds)
$M_{i18}$–$M_{i21}$—point identification (tens)
$M_{i22}$–$M_{i25}$—point identification (units)

The information to each line of memory is entered in parallel from the alarm bus, the delay clock and the decimal to binary converter.

Each memory element feeds its own output gate. The output gates will be described later on. All the memory resets (terminal R, FIG. 2e) are activated simultaneously. The memory resets in the system are physically grouped only because of drive consideration. They are all fed by the reset 3 signal. The nature of the reset 3 signal will be made clear later.

Decimal to binary converter

Let us go back to the outputs of the point cards.

When an event occurs, the evented point card transfers the interrogation pulse to the appropriate point identification or code busses. There are nine code busses (representing the decimal numbers one through nine) for each of the three digits required for identification, totaling 27 busses. Only one in each decade is actuated at one time. The digit zero in a decade is represented by the absence of a pulse in the decade. These busses enter the central system through the decimal to binary converter. This converter consists of three identical sections, one for each decade of point identification as shown in FIG. 10. Each section has 9 inputs (the code buses of that decade) and 4 outputs. The outputs express the input signal in binary form weighing the outputs in the following way: A—8, B—4, C—2, and D—1.

The outputs are fed to the set inputs of the appropriate memory bistables as follows:

| Convertor Outputs | Point Identification Memory Bistables | | |
|---|---|---|---|
| | Units | Tens | Hundreds |
| A | $M_{i,22}$ | $M_{i,18}$ | $M_{i,14}$ |
| B | $M_{i,23}$ | $M_{i,19}$ | $M_{i,15}$ |
| C | $M_{i,24}$ | $M_{i,20}$ | $M_{i,16}$ |
| D | $M_{i,25}$ | $M_{i,21}$ | $M_{i,17}$ |

These outputs also feed the control section which will be discussed later.

From FIG. 10, it can be determined that the outputs have the Boolean equations:

$$A = 8+9$$
$$B = 4+5+6+7$$
$$C = 2+3+6+7$$
$$D = 1+3+5+7+9$$

where the numbers on the right-hand side of the equations refer to the code busses of that decade.

The logic of this circuit group could have been done with diodes or regular nor circuits. However, due to loading conditions, it was deemed advisable to use the low power nors.

Resistors on the code busses to the +10 volt supply provide noise immunity, since there is a possibility that the code busses might be long wires.

Delay counter

A second basic source of memory information is the delay counter (see FIG. 12). The delay counter enters into memory the time difference (in tens of milliseconds) between the occurrence of the first event of a sequence and any subsequent event of that sequence.

Basically what happens is that the first event of a sequence opens a gate (N6 and M7, FIG. 34) feeding the input of the counter, allowing pulses with a 1 kc. repetition rate to drive the counter. At the proper times, the appropriate level of memory input is uninhibited and the count present in the delay counter is entered into memory. The counter will run continuously until reset to zero or until it reaches a count of 9.999 seconds. At this time the input pulses to the counter will be stopped and the counter will remain in the 9.999 state until reset to zero. The reset will occur at the end of a sequence when the entire system is reset to await a new sequence.

The counter will also be used when the system is operated in the analysis mode. The operation of the counter itself will be the same, although the input pulses will be stopped by other means. The control of the counter input will be described later in the control section.

The counter may consist of three identical divide by ten sections, S1, S2, S3 and S4 and one divide by sixteen section S5. The outputs of each decade are weighed in the standard manner, that is, 1, 2, 4 and 8. Therefore, the count in the divide by ten groups will proceed in the following sequence:

| T1 | T2 | T4 | T8 |
|---|---|---|---|
| 0 | 0 | 0 | 0 |
| 1 | 0 | 0 | 0 |
| 0 | 1 | 0 | 0 |
| 1 | 1 | 0 | 0 |
| 0 | 0 | 1 | 0 |
| 1 | 0 | 1 | 0 |
| 0 | 1 | 1 | 0 |
| 1 | 1 | 1 | 0 |
| 0 | 0 | 0 | 1 |
| 1 | 0 | 0 | 1 |
| 0 | 0 | 0 | 0 |

The divide by sixteen group will start in the same manner. However, the count in this stage will never get past nine or (1001). Before this stage can proceed to its next normal count, which would be 1010, the input to the entire counter is stopped and the counter sits and awaits reset.

Outputs of emitter followers E feed the set inputs of the memory bistables in the following manner:

T10 ---- $M_{i,13}$.
T20 ---- $M_{i,12}$.
T40 ---- $M_{i,11}$.
T80 ---- $M_{i,10}$.
T100 ---- $M_{i,9}$.
T200 ---- $M_{i,8}$.
T400 ---- $M_{i,7}$.
T800 ---- $M_{i,6}$.
T1000 ---- $M_{i,5}$.
T2000 ---- $M_{i,4}$.
T4000 ---- $M_{i,3}$.
T8000 ---- $M_{i,2}$.

The outputs T1 through T800 feed the analysis lamp drivers which will be described later.

The outputs $\overline{T1}$, $\overline{T8}$, $\overline{T10}$, $\overline{T80}$, $\overline{T100}$, $\overline{T800}$, $\overline{T1000}$ and $\overline{T8000}$ feed the 9.999 detect circuit which, we shall see later, inhibits the delay counter input.

A reset 1 signal resets the delay counter at the end of a sequence.

"A" commutator

The control of input flow to the memory is accomplished by the "A" commutator. The "A" commutator consists of eleven flip-flop stages F1 through F11 connected to form a unidirectional shift register (see FIG. 13). A reset 3 signal puts F1 in the "1" state and all of the other stages in the "0" state. A pulse generator P6 provides the shift pulse to propagate the "1" to the next higher stage. When the "1" reaches the eleventh stage, the register remains in that condition until the reset 3 signal occurs. At no time is there more than a single "1" in the register.

The false outputs of F1 through F10 are connected to nor common load circuits N1 through N10 which feed the inhibit inputs I1–1 through I10–1 etc. of the memory. The output of each nor circuit is connected to all the memory bistables in a single word or line of memory. In the absence of an event, the event line sits at a voltage such as −6.3 volts and every line of memory is inhibited. The occurrence of an event grounds the event line for 0.1 ms., and the line of memory corresponding to the "1" in the "A" commutator has its inhibit Ix (x equals 1 through 10) released allowing information to enter that line of memory. The full action of the event line will be covered in the control section.

Thus all the information in one word of memory is entered simultaneously.

Digital clock and calendar

All the information that eventually goes to the printer must pass through the output gates. The three sources of information to these gates are the memory, the digital clock and calendar, and the control section.

Let us now deal with the digital clock and calendar before discussing the output circuitry of the system.

Figure 15:
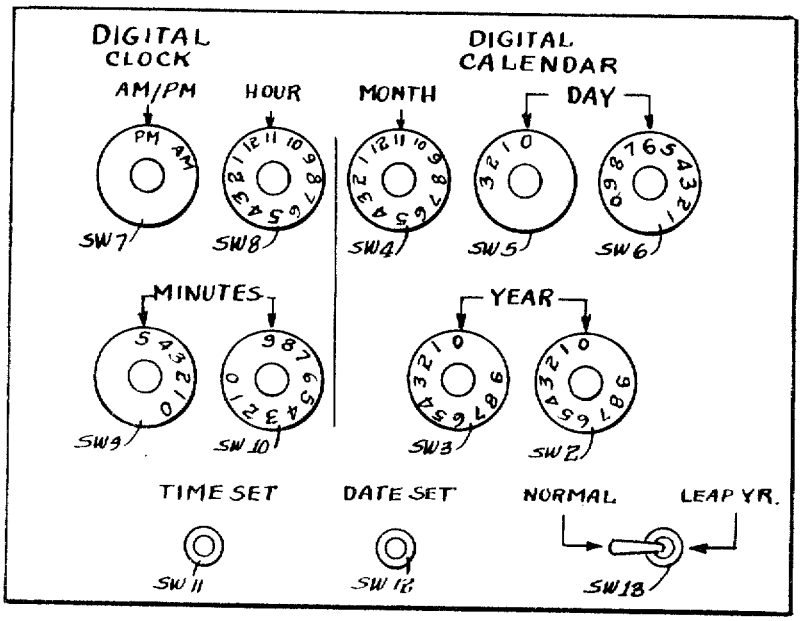
FIG. 15 illustrates an exemplary control panel for the clock and calendar circuit of FIG. 14.

The clock and calendar illustrated in the drawings is a solid state device. It operates from a 60 cycle voltage source, and its accuracy is dependent upon the frequency stability of this source. In addition to the A.C. input, D.C. power supplies are necessary for the operation of the solid state circuits employed in the design. The entire clock and calendar may use bistable multivibrators and nor gates as logic elements forming various counters such as seconds, minutes, hours, days, and months counters (see FIG. 14). A control panel P (FIG. 15) is provided to initially set the counters. Once set properly, the clock and calendar continues to advance itself: the seconds counter advances the minutes counter; the minutes counter advances the hours counter; the hours counter advances the days counter; the days counter advances the months counter, etc. The years, however, do not advance automatically, but are changed by two manual selector switches Sw1 and Sw2 located on a control panel (FIG. 15). Each year an operator must advance these switches to the proper year and, in addition, he must operate the leap year toggle switch Sw3 to compensate for the extra day in February by enabling the days counter to count one more unit before being resettable.

The control panel also contains rotary switches Sw4 through Sw10 by means of which the clock and calendar can be initially set to the correct date and time. To set the clock, the correct time is set or dialed into these rotary switches, and a time set pushbutton Sw11 is depressed. As long as the pushbutton is depressed, the clock will remain at whatever time was programmed into the rotary switches. Upon release of the pushbutton, the clock starts to run. To set the calendar the month and day must be programmed into the three rotary switches Sw4, Sw5 and Sw6, and the date set pushbutton Sw12 then depressed. The calendar is thus forced to whatever date was programmed into it. Upon release of the pushbutton Sw12, the calendar is again free to run.

Pulse Shaper (FIG. 16)

The pulse shaper circuit consists of two nor gates N101 and N102 in series. A capacitive speed-up network C1 and C2 is also used to improve response. The negative half of the 60 cycle input voltage is applied to the shaper such that the rise and fall time of this A.C. signal is greatly improved. The output approximates a square wave. This square wave output with a period of 16.7 ms. is then used to trigger the first counter of the clock. Due to the short time constant of the A.C. input of the bistable, it is not possible to trigger the circuit from a 60 c.p.s. sine wave, and it is for this reason that the input signal is shaped.

Divide by 60 counter (FIG. 17)

The primary function of this counter is to produce a series of pulses one second apart. This pulse train is then used to drive the seconds counter and also to synchronize print-out. Another output of this counter is a train of pulses 33 milliseconds in length recurring every 33 milliseconds. This signal is used to time the entry of digits to the printer.

How this counter generates the required functions can be seen by examining FIG. 17. In this diagram are shown the physical connections between the bistables and nors necessary to insure that the counter proceeds from one state to the next. The circuit can be thought of as two counters: a count of 12 and a count of 5. Each time the 12 state counter completes a cycle by going from eleven to zero, the 5 state counter is advanced one state. Thus, the two counters combined exhibit a total of sixty (5×12) independent states. The two tables in FIG. 17 list the states of the bistables for any given counter state. The two identifying digits associated with each bistable (e.g. F01, F02, . . . F48) also gives the code weight (1, 2, 4 or 8) to be assigned to that bistable when it is found to be in the "1" state. For example, if bistable F01, F04, and F24 were in the "1" state while the rest of the bistables were in the "0" state, the entire counter would be in the 29th state.

F01 code weight _____ 1
F04 code weight _____ 4
F24 code weight _____ 24
                                                  —
Weighted sum _____ 29

FIG. 17 also lists the equations for the commands required to shift the bistables from one state to another. The terms "set" means shift from the "0" state to the "1" state, and the term "reset" means shift from the "1" state to the "0" state. Also it must be noted that the bistables will only be shifted when the functions expressed by these set and reset commands rise from some negative voltage to ground.

Seconds counter (FIG. 18)

Figure 5:
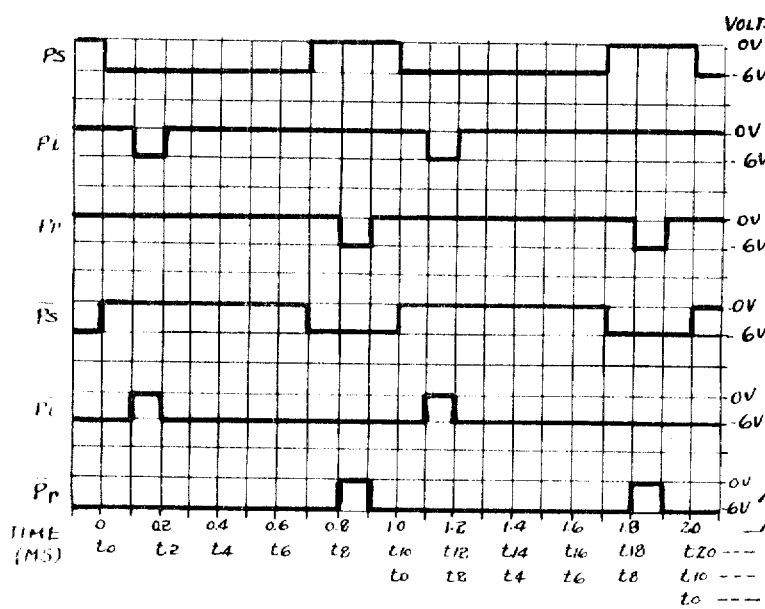
FIG. 5 shows various waveforms produced by the master clock of FIG. 4.

The seconds counter consists of seven bistables and two nor gates as pictured in FIG. 18. Actually, it can be thought of as two separate counters: a count of 10 and a count of 6. The count of 10 is called the seconds units counters and the count of 6 is called the seconds tens counter. With every ten steps of the seconds units counter, the tens counter shifts once. Altogether there are 60 separate states that are expressed by this counter, one defining each of the seconds in a minute. The counting sequence is standard binary coded decimal with a 1-2-4-8 weighting of the outputs. There are seven outputs that are utilized (S01, S02, S04, S08, S10, S20, S40). The two tables in FIG. 5 show the state of each bistable during any particular second. As an example, during the 35th second of any minute the following conditions exist:

| Bistable | State | Weighting |
|----------|-------|-----------|
| FS01     | 1     | 1         |
| FS02     | 0     | 0         |
| FS04     | 1     | 4         |
| FS08     | 0     | 0         |
| FS10     | 1     | 10        |
| FS20     | 1     | 20        |
| FS40     | 0     | 0         |
|          |       | [1] 35    |

[1] Weighted Sum.

Minutes counter (FIG. 18)

The minutes counter is exactly the same physically as the seconds counter. FIG. 18 will also be used to describe the minutes counter. The counter generates the following functions.

a. Seven outputs to the operations recorder (M01, M02, M04, M10, M20, M40).
b. One output to the hours counter (M40).
c. Set and reset commands to insure the counter will step properly from one state to the next.

Change an S to an M in the nomenclature of FIG. 18 and consider that the input is a one minute pulse (S40) and the output is a one hour pulse (M40). The diagram now represents the minutes counter.

Figure 19:
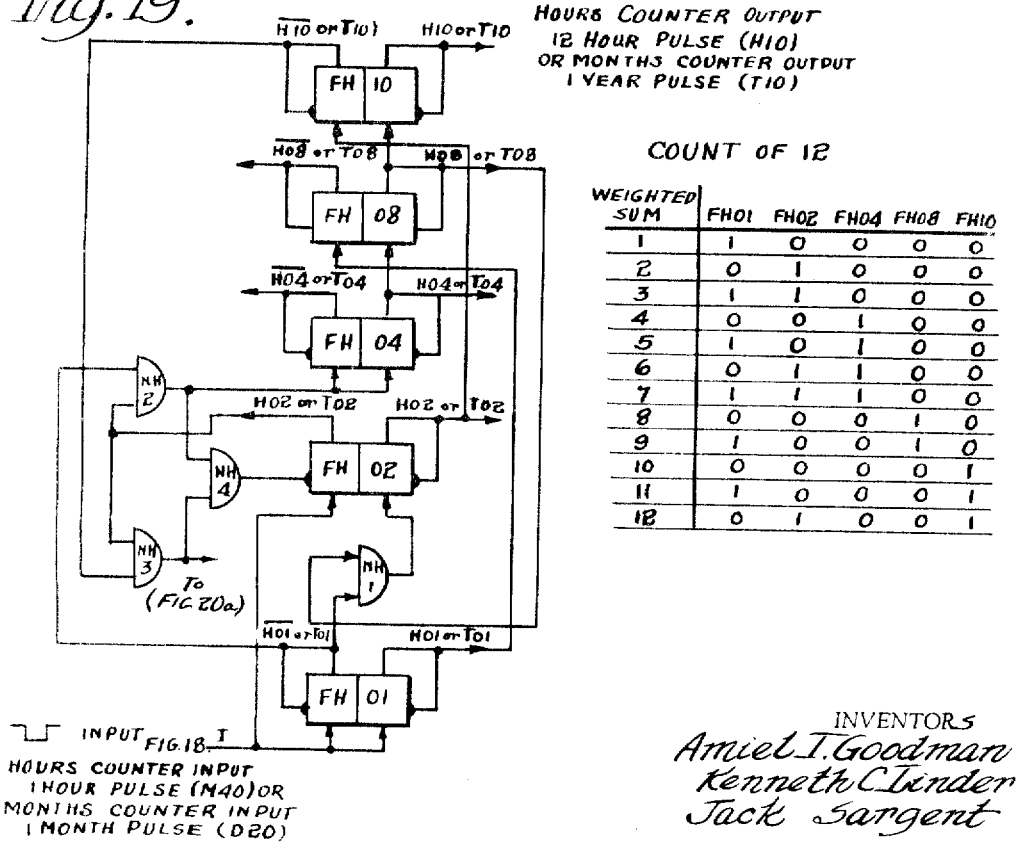
FIG. 19 is a circuit diagram of an exemplary counter used as the hours and months counter in the clock and calendar circuit.

Hours counter (FIG. 19)

The hours counter is a twelve state counter of the form illustrated in FIG. 19. The outputs generated by the configuration are binary coded decimal. The counter is driven by a pulse train derived in the minutes counter. This pulse train consists of a negative pulse every hour that effects one shift in state with each pulse. The shift in counter state takes place at the end of the input pulse when the signal is returning from some negative voltage to ground. The progression of counter states is also illustrated in the table of FIG. 19. Four nor gates (NH1, NH2, NH3, NH4) are used to generate the internal commands necessary to obtain the desired counting sequence.

With a twelve hour clock it is also necessary to record AM and PM. One additional bistable AP and one nor gate NH5 are used for this purpose as illustrated in FIG. 20. The input to this bistable is a signal that is negative except during the twelfth hour, then it is ground. To this end, the input of the nor gate NH5 is connected to the output of the nor gate NH3 in FIG. 19. By virtue of this function, the AM-PM bistable changes its state each time the hours counter steps from eleven to twelve. The AM-PM bistable outputs are fed to a gate GM4 in the printer gating circuit (FIG. 31) and to the days counter.

Days counter (FIGS. 21 and 22)

This counter consists of a pulse counter which counts to 10 driving a pulse counter which counts to 4. The count of 10 is called the units counter, and is of the same form as the tens counter in the seconds and minutes counter (FIG. 18). The output of the units counter drives the tens counter as is shown in FIG. 21. The entire counter is capable of counting to 39 before returning to 00. This cannot be allowed to happen, since this counter must count only the number of days in any given month and then return to 01. Therefore, an equation must be derived whereby the function it represents is capable of resetting the entire counter at the end of each month. FIG. 22 illustrates the circuitry used to accomplish the desired reset. Bistable FD21 normally remains inhibited in the "1" state except during the last day of the month when the output of a nor gate ND7 becomes ground. Then at twelve midnight the one day pulse resets FD21. One second later, this bistable is set again by the one second pulse. The output of the bistable is thus a one second pulse occurring at the beginning of each new month. This signal is buffered by an emitter follower ED2 and used to reset the days counter to 01. This reset pulse is applied to the D.C. set and reset inputs of the counter bistables, thus over-riding any tendency of the counter to advance to the next higher count. The nor gate logic array expresses the function:

$$f = (31 + \text{April } 30 + \text{June } 30 + \text{Sept. } 30 + \text{Nov. } 30 + (\text{Feb. } 28)(\overline{\text{Leap Year}}) + \text{Feb. } 29)$$

This function is negative except when any of the elements of the equation are true; then it is ground. Zero volts indicates that the last day of the month has arrived and that FD21 will be allowed to change state at the end of the day.

The diode output of ED2 provides isolation between the bistable D.C. set and reset inputs. This is necessary because these inputs are also used to set the calendar.

The function $\overline{\text{Leap Year}}$ is produced by the toggle switch SW3 on the control panel.

The functions April, June, Sept., Nov., and Feb. are produced by the months counter (FIG. 19) in conjunction with the special functions generator of FIG. 23.

The primary input to the days counter is a pulse train, derived in the hours counter, that advances the days counter one state each day at twelve midnight and also serves to reset FD21 at the end of the month. The days counter generates the following functions:

(a) A pulse output (D20) used to advance the months counter.
(b) Four binary coded decimal outputs (D01, D02, D04, D08) from the four stages FD01, FD02, FD04 and FD08 of the units counter.
(c) Two binary coded decimal outputs (D10, D20) from the tens counter.

*Months counter (FIG. 19)*

The months counter is a twelve state counter identical to the hours counter. Refer back to the description on the hours counter that relates to FIG. 19. The counter is driven by a pulse train derived in the days counter. The pulse train has a positive rise once at the end of each month that advances the months counter one state each month.

In addition to the basic counter, four nor gates are utilized to produce special functions that are needed in the days counter. FIG. 23 shows these nors and the functions (Feb., April+June, Sept., Nov.) they produce.

Four outputs (T01, T02, T04, T08) represent binary coded decimal outputs of the months units counter used as inputs to other portions of the recorder. The other output T10 used in the operations recorder defines the months tens digit.

*Selector switches*

As explained in the general description of the clock and calendar, two rotary switches SW1 and SW2 are provided on the control panel to manually insert the tens and units digits of the year. These switches have binary coded decimal outputs exactly like the solid state count of 10. There are four outputs (coded 1, 2, 4, 8) associated with each switch. These outputs are used by the operations recorder to define the year. The switches require 4 poles and 10 positions.

The necessity for and operation of the date and time switches SW4–SW10 and pushbuttons SW1 and SW2 have been explained previously. It will suffice to say here that these switches program D.C. set and reset commands to all the bistables in the counters. The execution of the commands is dependent upon the operation of the time and date set pushbuttons.

*"Y" commutator (FIG. 25)*

The output gates are controlled by the "X" and "Y" commutators that primarily determine which gates shall feed information to the binary to decimal converter 16.

The "Y" commutator consists of thirteen flip-flops F1 through F13 connected together to form a unidirectional shift register (see FIG. 25). As with other commutators, the "Y" commutator has the condition that only one stage is in the "1" state at any time. However, this commutator can be set to four separate conditions of operation referred to as YD, YK, Y1 and Y11 conditions of operation where the "1" state is respectively in stages 1, 2, 3 and 13 of the register. The logic for setting of the "Y" commutator in any of these conditions is accomplished by the diode gating network (diodes D1 through D5). The commutator can be set into either of these conditions depending on which signal is generated by the control logic on the input set busses "SET YD," "SET YK," "SET Y1" and "RESET 3."

In the absence of a "Y" shift inhibit signal, the "1" in the commutator is propagated to the next higher numbered stage by a pulse from the pulse generator. When the "1" reaches the thirteenth stage, the register remains in this condition until the commutator is set to the YD, YK or Y1 condition.

Basically, the "Y" commutator determines which information will be sent to the binary to decimal converter 16, and thence to the printer 20. In the YD condition, calendar information is read out; in the YK condition clock information is read out. Stages 3 through 13 determine which word of memory is to be read out. Note that flip-flops F4 through F12 are identical in structure.

*"X" commutator (FIG. 26)*

While the "Y" commutator controls which word of information should be sent to the printer, the "X" commutator controls which digit or character of the determined word should be printed. A character consists of four binary bits.

Essentially, the "X" commutator sends four bits (binary coded decimal) at a time to the binary decimal converter 16. As will be seen later, the printer receives eight characters of information and a print signal for each line that is printed.

As shown in FIG. 26, the "X" commutator consists of ten flip-flop stages F1 through F10 connected to form a ring counter. Stages F3 through F8 thereof are identical in structure.

A reset 3 signal places flip-flop F10 in the "1" state and all of the other stages in the "0" state. The reset 3 signal is a safety reset, since it will occur when the counter is in the X10 state (except when the start button is depressed).

The "1" is shifted around the counter by the pulse generator P6, going from F10 to F1 to F2 etc., one step at a time. Only one stage is in the "1" state at any time.

The "X" shift signal comes from the control circuitry of FIG. 36 and when present is a bank of ten pulses (33 milliseconds wide with a repetition rate of 66 milliseconds) occurring once per second.

Outputs X10, $\overline{X10}$, and $\overline{X1}$ go to the control circuitry of FIG. 37. Output X1 also goes to the mode identification gates of FIG. 31; outputs X9 and $\overline{X9}$ feed the print gates of FIG. 31; and outputs $\overline{X2}$ through $\overline{X8}$ feed the clock, calendar, memory, and format gates of FIGS. 26, 27, 28, and 29.

*Output gates (FIGS. 27–31)*

The output gates with their associated controls determine the format that an eight digit serial entry printer produces on the printer tape. There are four basic types of print-out presented: date, time, memory information, and all clear.

The format is as follows:

| Printer Column | 1 | 2 | 3 | 4 | 5 | 6 | 7 | 8 |
|---|---|---|---|---|---|---|---|---|
| Date | D | Month (tens) | Month (units) | Day (tens) | Day (units) | Space | Year (tens) | Year (units). |
| Time | AM or PM | Hour (tens) | Hour (units) | Minute (tens) | Minute (tens) | Space | Second (tens) | Second (units) |
| Memory Info | Mode of Operation | Space | Delay Time (seconds) | Delay Time (tenths) | Delay Time (hundths.) | Point Ident. (hundths.) | Point Ident. (tens) | Point Ident. (units). |
| All Clear | Space | Space | Space | Cipher | Cipher | Space | Cipher | Cipher. |

A period is placed between columns 3 and 4. Also, a colon is placed between columns 5 and 6.

Basically, the row is determined by the "Y" commutator and the column by the "X" commutator.

Columns 2 through 8 present numerical information. Column 1 presents lettered information in the following manner:

| Print-Out | Meaning | Classification |
|---|---|---|
| D | Date | Date. |
| AM | Morning | Time. |
| PM | Afternoon | Time. |
| A | Alarm | Memory Information. |
| N | Return-to-normal | Memory Information. |
| S | Off-normal-summary | Memory Information. |
| T | Test | Memory Information. |

The gates also determine whether the printer will print the information entered in red or in black.

The output gates can be broken down into four main sections.

(1) Memory gates (FIG. 27).
(2) Clock and calendar gates (FIGS. 28 and 29).
(3) Mode identification and print gates (FIG. 31).
(4) Format gates (FIG. 30).

The correlation of these gates with the "X" and "Y" commutators are as follows:

The mode identification gates are all the gates associated with the X1.

The print gates are those associated with the X9 output of the "X" commutator.

The calendar gates are associated with the YD and X2 through X8 outputs of the "X" commutator and "Y" commutator.

The clock gates are associated with the YK and X2 through X8 outputs of the "X" and "Y" commutators.

The memory gates are associated with the Y1 through Y10 and X2 through X8 outputs of the "X" and "Y" commutators.

The format gates supply false "0's" where required.

The MOR-OR circuit (FIG. 2b) is used in the various output gate circuits of the system. When this circuit is used as a memory, clock, or calendar gate the D output is not used. The E outputs of the gates feed busses which are called CW1, CW2, CW4, and CW8, where the numbers refer to the binary code weight that is assigned to each bus line.

Referring to FIG. 27, each memory gate is identified by the character $G_{ij}$ where the subscripts $i$ and $j$ refer to the corresponding $i$ and $j$ subscript of the memory bistable associated with that gate. The B output (FIG. 2d) of memory bistables $M_{1,2}$ through $M_{1,25}$ (FIG. 9) are connected to the C input of corresponding gates $G_{1,2}$ through $G_{1,25}$ of FIG. 27.

Gates $G_{1,1}$ are connected to the memory alarm bistables and will be considered as being in the format and mode identification grouping.

The B inputs of the memory gates $G_{ij}$ are connected to the corresponding $Y_i$ outputs of the "Y" commutator (FIG. 25).

The A inputs of the memory gates are connected to "X" commutator in the following manner:

$\overline{X}_3$ to $G_{1,2}$ through $G_{1,5}$
$\overline{X}_4$ to $G_{1,6}$ through $G_{1,9}$
$\overline{X}_5$ to $G_{1,10}$ through $G_{1,13}$
$\overline{X}_6$ to $G_{1,14}$ through $G_{1,17}$
$\overline{X}_7$ to $G_{1,18}$ through $G_{1,21}$
$\overline{X}_8$ to $G_{1,22}$ through $G_{1,25}$ FIG. 27 shows the interconnections in a single word of memory gating ($i$th level).

Note that each X position allows four and only four gates to feed the 4 code weight busses.

The calendar output gating of FIG. 28 consists of nineteen gates. These are all associated with the YD or first stage of the "Y" commutator. The information inputs come from the digital calendar.

The clock output gating is depicted in FIG. 29. The $\overline{PM}$ output of the clock is considered to be associated with the mode identification gating. Note that the clock gating is controlled by the YK or second stage of the "Y" commutator.

As in the other gating circuits, the outputs of the clock and calendar gates feed the code weight busses CW.

There are gates that appear to be missing as far as feeding all 4 code weight busses for certain X positions. These gates are augmented by the format gates to establish false zeros.

The code weight busses CW at any time represent a four digit binary number in the following manner. A negative voltage on any bus designates a "0" for that code weight. If all four busses have a negative voltage, the binary number represented is 0000.

Each decimal number from zero (0000) through nine (1001) is decoded in the binary to decimal converter 16 to drive a digit enter solenoid in the printer. The decimal numbers ten (1010) and eleven (1011) drive the red and black print solenoids respectively.

Note that the bus coding uses the representation that a negative voltage means a "0" and no voltage means a "1." This is the opposite sense that is used in the rest of the system.

In the format gating (FIG. 30), the signal input labeled C has the Boolean function $\overline{C}=\overline{YD}+\overline{YK}$ ($\overline{YD}$ means an absence of a "1" signal on output YD or a "1" signal on output $\overline{YD}$ of the "Y" commutator, etc.). Thus, if a function signal C is applied to the input of a gate, that gate can produce a signal only during the time that the "Y" commutator is in the YD or YK condition. In other words, that gate can produce a signal only during the printing out of date or time. Similarly, the application of $\overline{C}$ to a gate means that the gate can produce a signal whenever memory information is being printed.

The purpose of the format gating is to provide false zeros in selected locations. These false zeros either complete a number that is not completely defined or provide a zero on all four buses to force the printer to skip a space. These latter zeros will not appear on the read-out because of mechanical zero eliminate features inherent in the printer itself. A printer operating on this principle is the Premier printer manufactured by the Victor Adding Machine Company. The print wheel in the first column of the printer contains the following letters in their respective numbered positions.

| Decimal Number | Print Wheel | Binary Number |
|---|---|---|
| 0 | Blank | 0000 |
| 1 | D | 0001 |
| 2 | M | 0010 |
| 3 | L | 0011 |
| 4 | A | 0100 |
| 5 | M | 0101 |
| 6 | T | 0110 |
| 7 | S | 0111 |
| 8 | PM | 1000 |
| 9 | AM | 1001 |

The mode identification gating (FIG. 31) provides the code busses with the appropriate number to designate the proper letter when the first stage of the "X" commutator is in the "1" state. The print gating circuit (FIG. 31) provides the decimal numbers ten or eleven, which allow either the red print or the black print solenoid to be energized when the ninth stage of the "X" commutator is in the "1" state.

The letter D only appears when the "Y" and "X" commutators have their "1" states respectively in the first stages thereof. Gates GM1, GM2, and GM3 (FIG. 31) provides voltages on the CW8, CW4, and CW2 busses so that the binary number represented on the code busses is 0001. No gate is needed for the CW1 bus in this case.

When the "Y" commutator has a "1" state in the second stage thereof, the only allowable print modes are AM and PM. Gate GM1 provides a "1" on the CW8 bus. Gates GM2 and GM3 provide "0" on the CW4 and CW2 busses. Gate GM4 distinguishes between AM and PM on the CW1 bus.

When the end of print signal is desired, the signal $\bar{E}$ is generated in the central control logic. At this time gates GM5, GM6, and GM7 provide "0" on the CW4, CW2, and CW1 busses. Gate GM1 provides "0" on the CW8 bus. The number generated is 0000, which places a blank in column 1 of the printer.

There are two other signals (B and T) generated in the control logic indicating when the machine is operated in the test (T), summary (S), or operational (A or N) mode.

The T signal means that the machine is in test mode. The B signal means that the machine is in either summary or test mode. The Boolean situation $B\bar{T}$ cannot exist. If $\bar{B}T$ exists, the machine is in the operational mode, either alarm (A) or return-to-normal (N).

To produce these four letters (A, N, T or S), gate GM1 provides "0" on CW8 and gate GM2 provides "1" on CW4, since these four letters can only appear when the "Y" commutator has a "1" state in stages 1 through 10.

If the machine operates in either test or summary mode, gate GM8 provides a "1" signal on the CW2 and GM9 busses to differentiate between T or S.

In the operational mode, gate GM8 provides "0" on the CW2 bus. Gate $G_{1,1}$ distinguishes between A and N depending upon the state of the corresponding $M_{1,1}$ alarm bistable, which holds the state information for the event being printed out.

The print signal for the machine occurs when the "X" commutator has a "1" state in the ninth stage thereof. At this time, the desired signal is either 1010 for red print or 1011 for black print. Gate $G_{p,1}$ provides "0" on the CW4 bus at this time. The absence of gates provides "1" signal on the CW8 and CW2 busses. Gate $G_{1,1}$ distinguishes between red and black print on the CW1 bus as determined by the alarm bistables, in the same manner as the A and N letters were differentiated.

*Binary to decimal converter (FIG. 32)*

The binary to decimal converter 16 receives the binary signals on the code weight busses CW, combines them with a print and enter pulse generated by control sections 3 (FIG. 36), and actuates the appropriate print amplifier 18. The print amplifiers drive solenoids in the printer 20.

Figure 32:
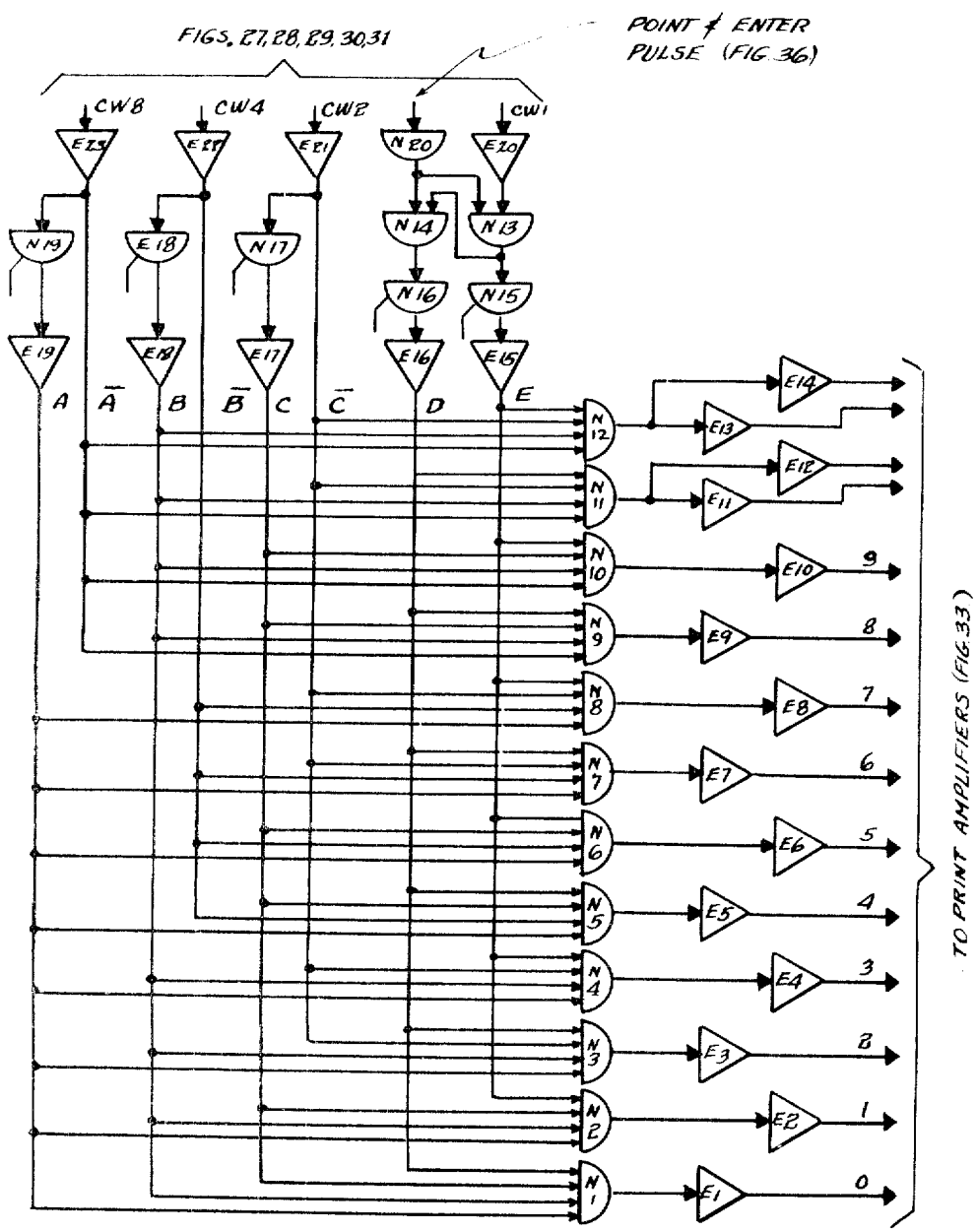
FIG. 32 is a circuit diagram of an exemplary binary to decimal converter used in the system of FIG. 1.

FIG. 32 is the schematic diagram of the binary to decimal converter. Note that the lines labeled A, $\bar{A}$, B, $\bar{B}$, C, $\bar{C}$, D and E have the following Boolean characteristics where CW1 means the presence of a "1" signal on bus CWX and $\overline{CW1}$ means the absence of a "1" signal on bus CWX:

$$\bar{A}=CW8 \qquad A=\overline{CW8}$$
$$\bar{B}=CW4 \qquad B=\overline{CW4}$$
$$\bar{C}=CW2 \qquad C=\overline{CW4}$$
$$E=(P)(\overline{CW1})$$
$$D=\bar{P}+(P)(\overline{CW1})=\overline{(P)(CW1)}$$

where P represents the print and enter pulse.

The nor gates N1 through N12 combine the appropriate four of the eight functions produced to supply the proper output of the converter. For example: The nor inputs to gate N7 are outputs A, $\bar{B}$, $\bar{C}$, and D. Therefore, the output of nor gate N7 has the Boolean function $\bar{A}\ B\ C\ \bar{D}$. (Remember that the code weight busses carry the inverse of the normal binary code weighting. This has been referred to earlier in the gating section of the report.) This output enters the digit input "6" of the printer. In a similar way, the other eleven outputs can be energized. Only one output can be energized at a time.

The outputs to the print amplifiers have double emitter followers because of the greater drive required for the print solenoids.

*Printer amplifiers (FIG. 33)*

The ten "digit enter" amplifiers are all identical and the two "print" amplifiers are identical. Their circuit diagrams are shown in FIG. 33. Diode D3 and resistor R6 provide a common bias for all twelve amplifiers. Diodes D1 and D2 act as suppressors for the printer solenoids. The solenoids depress the proper keys of the printer to provide the printed output tape of the system.

*Control sections (FIGS. 34–40)*

The heart of the entire system are the control sections 3a, 3b, 3c, etc. This group of circuits initiates, synchronizes, and stops the functions of almost all of the sections discussed previously. Before going into the internal controls, let us refer back to FIG. 4 and review and interpret the outputs of the master clock. Note that at $t_0$, waveform $P_s$ goes negative and waveform $\bar{P}_s$ goes positive. If waveform $P_s$ was fed into a D.C. set of a flip-flop (inputs C or D of FIG. 2d), the collector of that side of the flip-flop would be driven to ground at $t_0$.

If waveform $\bar{P}_s$ was fed into the A.C. input of a flip-flop (inputs G or M of FIG. 2d), and the inhibit input (inputs E or F of FIG. 2d) of that side of the flip-flop was at ground, then the collector of that side would be driven negative at $t_0$. The other pulses would act in similar ways.

For the purpose of discussion, we shall refer to the various master clock times by more descriptive terms as follows:

$t_0$, $t_{10}$, $t_{20}$, etc.—beginning of swamp
$t_1$, $t_{11}$, $t_{21}$, etc.—beginning of interrogation
$t_2$, $t_{12}$, $t_{22}$, etc.—end of interrogation
$t_7$, $t_{17}$, $t_{27}$, etc.—end of swamp
$t_8$, $t_{18}$, $t_{28}$, etc.—beginning of reset
$t_9$, $t_{19}$, $t_{29}$, etc.—end of reset The above will be the only times used to initiate internal control functions.

Note that the master clock outputs cycle continuously, except when the start button is depressed.

The external controls to the system are:

(1) Start switch—sets the system in the normal condition, ready to receive new information. Is only used to start up the system or to reset the system after analysis or lockup.
(2) Test switch—alarms every point while switch is closed. Used for maintenance check.
(3) Off-normal-summary switch—calls for a listing of all points in alarm.
(4) Acknowledge switch—turns off new print lamp which indicates that an event had occurred since the acknowledge switch had been depressed previously.
(5) Analysis switch—calls for the read-out of the numerical value of a malfunctioning or missing point card on the bank of analysis lamps.
(6) Stop lamp—indicates that a malfunction has occurred and that machine has been locked up and must be repaired and restarted.

There is a diode connecting the start switch and the acknowledge switch, such that the start switch will perform all the functions of the acknowledge switch in addition to its (the start switch)) own function. In a similar manner, there is a diode between the analysis and the test switches, so that the analysis switch also performs the functions of the test switch.

When a sequence of events occur the appropriate code busses 6 will be energized and the alarm bus 6' will be energized if the event was in alarm. This will occur at or after the introduction of the $P_i$ pulse into the point cards (allowing for time delays and propagating the $P_i$ pulse through the point cards), and before the end of the swamp pulse. The code busses feed the decimal to binary converter 7. The outputs of the converter and the alarm bus feed the appropriate set inputs to the memory. The converter outputs also drive nor gates N1, N2, and N3 of the control section of FIG. 34. The ganged output of these nor gates signifies that an event has occurred by going to ground for 0.1 milliseconds. This output feeds nor gate N4, which in turn feeds nor gate N5. At this time the other inputs to these nor gates will be zero. Under these conditions, the event line (N5 output) is the same as the output of nor gates N1, N2, and N3.

The event line goes to the emitter follower E2 (FIG. 13) of the "A commutator, allowing the appropriate memory word to be uninhibited. In this case it will open up memory bistable $M_{i,j}$, since the "A" commutator has a "1" state in the first stage thereof. This will allow the code and alarm busses 6 and 6' to set the information in the first storage position of memory 5. Also the outputs of the delay counters are released to the memory. In this case there will be zero time delay entered.

Figure 34:
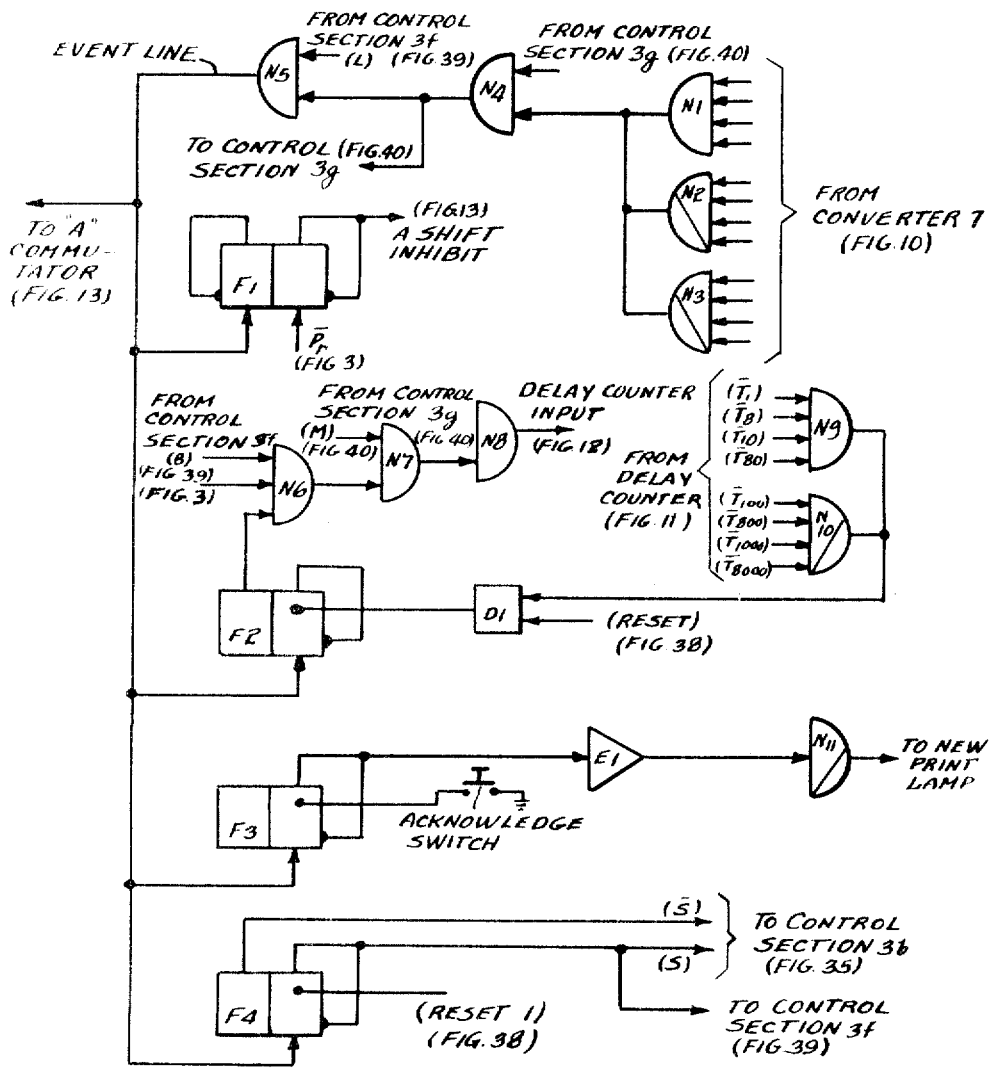
FIG. 34 is a circuit diagram of an exemplary information enter control circuit used in the system of FIG. 1.

The event line also trips flip-flop F1 in FIG. 34 which releases an A shift inhibit and allows the pulse generator (FIG. 13) to advance the "1" state of the "A" commutator one position as the end of the swamp pulse. At the beginning of reset internal, flip-flop F1 is reset by reset pulse $\overline{P}_r$ to keep the "1" state of the "A" commutator in its second stage or position until the next event is entered.

The event line also trips flip-flop F2 of FIG. 13 opening gate M6. The input to gate M6 labeled "B" is zero in this mode of operation (as is the analysis circuit input to gate N7). The output of gate N8, which equals the output of gate N6, then advances the delay counter one count every millisecond at the beginning of succeeding swamp pulses. The delay counter will continue to run until reset "1" signal appears or the counter reaches a count of 9.999 seconds, whichever occurs first. If the 9.999 count is reached first, the ganged output of gates N9 and N10 of FIG. 34 goes negative locking flip-flop F2, which in turn closes gate N6 so that no more counts are received by the counter. This condition will hold until the reset 1 waveform appears. The reset 1 waveform is a 50 microsecond pulse timed so that it originates at $t_9$.

The function of the reset 1 waveform is to completely clear the system when the system has completed a sequence and is prepared to await a new sequence.

The event line also trips flip-flop F3 in FIG. 34 which causes the new print lamp to light through emitter follower E1 and gate M11. Flip-flop F3 is reset manually by the acknowledge switch.

The final function of the event line is to trigger flip-flop F4 in FIG. 34. Flip-flop F4 will remain flipped throughout a particular sequence. Its primary function is to indicate the start and presence of an event sequence.

A second event in the same sequence will enter the second storage position of the memory in the same manner that the first event entered the first storage position thereof. The event line will then be activated opening the memory inhibits associated with the second stage or position of the "A" commutator. Also flip-flop F1 (FIG. 34) will be tripped, allowing the "A" commutator to shift its "1" state to the third stage or position at the end of the swamp period. Flip-flops F2, F3 and F4 will not be affected since they have not been reset since being tripped by the first event pulse. The delay counter has been running since the first event so that when memory bistables M2-2 to M2-13 were uninhibited, at the time of the event line actuation, the count of the delay counter was entered into those bistables. In a similar manner, subsequent events in the sequence will be entered into their appropriate storage position of memory.

Information is being continually read out of memory by means of the "Y" and "X" commutators at a rate of one line or position per second. Assume that the "1" state of the "Y" commutator is in the next to last stage or position and that the "X" commutator has stepped into the first stage or position. The "X" commutator is now stepped along reading out one digit at a time until it advances to the "1" state signal to the next to last position thereof. At this time the "1" state of the "Y" commutator will be advanced to its last stage or position (note that there is no memory level associated with this stage or position). With the "1" state of the "X" commutator in its next to last position, the "1" state of the "Y" commutator in its last stage or position and the "1" state of the "A" commutator in the last stage or position, nor gates N37 and N38 (FIG. 38) will flip bistable F15. The combined signals from bistable F15 and the master clock result in a 50 microsecond pulse being produced at reset 2 and 3, occurring at the end of the reset pulse. Note that bistable F15 is reset at the end of swamp. Reset 3 is used to clear memory (see FIG. 9). Reset 2 is used to set bistable F5 (see FIG. 35). When the next $\overline{P}_r$ pulse appears, nor gate N12 produces a voltage which in turn resets the "1" state of the "Y" commutator into the first stage or position thereof. Reset 3 is used to set the "1" state of the "A" commutator to its first stage or position (see FIG. 13). Reset 3 also sets bistable F17 (see FIG. 38) which now lets the interrogation pulses to enter the point cards. The first piece of information enters at the position or level of memory, and the "A" commutator is advanced as described previously. The "X" and "Y" commutators will again continue to read out the information as previously described. If the number of alarm points during the second entry is less than 10, then the "1" state of the "A" commutator will be at some stage or position which is less than the last thereof. When the "Y" commutator has caught up to the "A" commutator, information will again be inhibited and the blank line of memory will be read out producing a 0000 print out. At this time reset 1 and 3 will occur clearing the entire machine and await further information from the point cards.

Assume that the tenth point in a sequence has just alarmed. Under this condition, the "1" state of the "A" commutator is in the next to the last stage or position thereof placing into the tenth position of memory the information from the tenth evented point. Once this has occurred, the "1" state of the "A" commutator will be shifted to the last stage or position thereof. This will occur at the end of the swamp pulse. With the "A" commutator sitting in this state, which signifies that the memory has been filled, any further information is inhibited from entering memory. This is done by stopping the interrogation pulse to the point cards until the memory has been cleared. The output or nor gate N35 (FIG. 37) flips flip-flop F17 (FIG. 38) whose W output performs this function. Note that the output of nor gate M35 produced a negative voltage prior to the "A" commutator's shifting of its "1" state signal into the last stage or position. Once it has done so it drives this output to ground. At this state it is assumed that the "Y" commutator has not caught up to the "A" commutator. With the bistable F17 (FIG. 38) flipped, the W output is now at a negative potential. The negative voltage is fed to nor gate N48 (FIG. 40) which in turn clamps the output voltage of the nor gate circuit such that no further interrogation pulses can be sent to the point cards. Once the interrogation pulses have been inhibited no further information can entry memory.

We have seen how information is dumped into memory. The problem now is to deliver this information to the printer in an acceptable form. Information leaves the memory through the output gates which are controlled primarily by the "X" and "Y" commutators. The "Y" commutator controls the level of memory to be read out. Also, the "Y" commutator can select whether information is to be read from the clock or the calendar. The "X" commutator selects each decimal digit (4 binary bits) to be read out of that selected level.

Before describing the control of the commutators, the possible modes of operation required of the commutators by the system will be reviewed. In the stand-by condition, the "Y" commutator (FIG. 25) has a "1" state in the thirteenth stage and the "X" commutator (FIG. 26) has a "1" state in the tenth stage. The commutators are forced into these states whenever the reset 3 pulse appears. In the normal operational mode, at the start of a new sequence, the "Y" commutator will initially be set to the YK condition where the second stage thereof has a "1" state to allow the system to read out the time of day. The receipt of a one second pulse from the digital clock will then allow the "X" commutator to cycle once, feeding the clock information to the binary to decimal converter one decimal digit at a time and, where the ninth stage of the "X" commutator will have a "1" state to enter a print command. The next one second pulse will enable the "Y" commutator to shift the "1" state on stage to the third stage and the "X" commutator to recycle. If the memory is not filled, this process will continue until the memory is read and a reset 1 pulse prepares the system to receive the next sequence.

If the memory is filled during a sequence, the commutators will operate in the same fashion as described above. However, when all of the information stored in memory has been sent to the printer, a reset 2 pulse will appear (note: a reset 3 pulse is present whenever a reset 1 or reset 2 pulse appears). At this time memory is cleared, new information enters memory, the "Y" commutator is set to the condition where the "1" state is in the third stage and the process of getting information out of memory continues.

A third mode of operation occurs when the demand date switch DS (FIG. 35) is closed. If no sequence is present, the first stage of the "Y" commutator is then set to a "1" state and the calendar information is entered. The "Y" commutator then shifts the "1" state to the second stage thereof and the clock information is entered. If no sequence has initiated in the two seconds required to perform the above operation, a reset 1 pulse appears. However, if a sequence has been started, the "X" and "Y" commutators will continue as in the normal operating mode.

If a demand date signal is received while the system is in a sequence, then the system will complete its operation including the reset 1 pulse and will then go into the date mode of operation.

In control section B (FIG. 35), flip-flop F7 holds the information that a date print-out has been requested. This flip-flop is set by a signal from the demand date switch DC. Flip-flop F7 is reset when the output of nor gate N17 goes to ground when the tenth stage of the "X" commutator is in the tenth stage thereof and the "Y" commutator shifts the "1" state condition from its second to its third stage. Thus, flip-flop F7 is flipped when the system is not in a sequence and the printer has entered calendar and clock information.

Flip-flop F5 of FIG. 35, on receipt of a reset 2 pulse releases nor gate N12 so that the third stage of the "Y" commutator is set to the "1" state Y1 through the emitter follower K2 of FIG. 35 at the beginning of reset. At the end of reset, with the "Y" commutator in the latter condition, flip-flop F5 of FIG. 35 is reset.

Flip-flop F6 in FIG. 35 acts in a similar way to provide one of the conditions for release of nor gates N13 or N14 after the receipt of a reset 1 pulse.

As noted before, a reset 1 pulse places the "Y" commutator in the condition where the thirteenth stage is in a "1" state so that flip-flop F6 in FIG. 35 will not be reset until nor gate N16 receives a signal indicating that the "Y" commutator has been set to a "1" state in either its first or second stage. The output of nor gate N16 in FIG. 35 provides the signal $\overline{C} = \overline{YD} + \overline{YK}$ used in the format and mode identification gating.

If a new sequence starts the $\overline{S}$ output of flip-flop F4 in FIG. 34 goes to ground and the nor gate N13 of FIG. 35 is enabled to set the second stage of the "Y" commutator to the "1" state at the beginning of reset.

Similarly, if flip-flop F7 in FIG. 35 is set, flip-flop F4 of FIG. 34 has a "1" state signal on the $\overline{S}$ output and flip-flop F6 in FIG. 35 has not been reset since the last reset 1 pulse, the first stage of the "Y" commutator is set to a "1" state. Note that once the first or second stage of the "Y" commutator has been set to a "1" state, flip-flop F6 is reset (at the end of reset) and will continue to inhibit nor gates N13 and N14 of FIG. 35 until reset 1 appears again.

As will be seen later, the output of nor gate N19, which has the Boolean function ($\overline{S}$, X10, Y1) is used to derive the reset 1 waveform.

The output of nor gate N15 (which has the Boolean function $\overline{S+D}$) feeds control section C, whose main function is the control of the "X" commutator and the print and enter pulse.

Before going into the control of the "X" commutator, the characteristics of the "X" commutator should first be reviewed as follows:

(1) In the stand-by condition (after the reset 3 pulse occurs) the commutator shall have a "1" state in the tenth stage.
(2) The commutator shall shift to a condition where the "1" state is in the first stage after the following have occurred:
    a. A sequence has started or is present or a date has been requested.
    b. A one second pulse has been received from the digital clock.
    c. The "1" state of the "Y" commutator is present in the first, second, or third stage thereof.
(3) The "X" commutator shall shift every 66 milliseconds until the "1" state reaches the tenth stage.

(4) After entering the latter stage, the "1" state of the commutator shall remain in that stage until the "Y" commutator is shifted and the next one second pulse appears; then the "X" commutator shall recycle as in characteristic 3 above.

The shifting of the "X" commutator is achieved by the output of flip-flop F12 (FIG. 36), flipping from negative to ground. This occurs at the beginning of swamp when the output of the diode "or" gate D3 is grounded. In the stand-by condition, the V input of diode D3 is grounded and the H and J inputs are negative.

When condition 2a above is fulfilled, the inhibit input to flip-flop F10 ($\overline{S+D}$) is zero. The G output of flip-flop F9 will flip to ground at the beginning of the first reset $P_r$ pulse following the one second pulse from the digital clock. This causes the H output of flip-flop F10 to go to ground indicating that conditions 2a and 2b above have been fulfilled.

At the beginning of reset, a pulse appears on the "set $(YD+YK+Y1)$" input of flip-flop F8, sending output J thereof to ground. This input comes from diode D5 of the "Y" commutator (FIG. 25) and indicates that condition 2c above has been achieved.

Thus, all three parts of condition 2 have occurred and the "X" commutator shifts to a "1" state in its first stage at the beginning of the swamp pulse $P_s$. Flip-flop F12 of FIG. 36 being flipped allows flip-flop F13 to be flipped at the end of interrogation. Flip-flop F13 triggers flip-flop F14 driving output V thereof negative, inhibiting flip-flop F12. Line K leading to nor gate N21 in FIG. 36 comes from the digital clock and has a 15 c.p.s. square wave phased so that it goes negative when the one second pulse from the digital clock triggers flip-flop F9. Therefore, flip-flop F14 will be reset approximately 66 milliseconds after it is flipped. As long as lines H and J remain at ground, the flip-flops F12, F13, and F14 will continue to recycle at this 66 millisecond repetition rate. Thus, the "X" commutator will cycle at this rate. However, when the "X" commutator shifts its "1" state to the tenth stage thereof (at the beginning of swamp), flip-flop F8 will be reset driving line J negative, and at the end of swamp line H will go negative. Thus, the "X" commutator has cycled once, and we have the same conditions on the inputs of diode D3 of FIG. 36 as we did in the stand-by condition.

However, flip-flop F10 of FIG. 25 flipping back triggers flip-flop F11, releasing the "Y" shift inhibit, allowing the "Y" commutator to shift at the beginning of the next reset. The output of the "Y" commutator pulse generator (FIG. 25) is also fed to the input of flip-flop F8 in FIG. 36 driving line J to ground. The system remains in this state until the one second pulse appears and the "X" commutator then recycles. This will continue until the system is reset and the output of nor gate N15 (FIG. 35) goes negative.

Nor gate N22 in FIG. 36 produces the function $V\overline{K}$ which is a bank of 9 pulses, 33 milliseconds wide with 33 milliseconds between pulses, and one second between each bank. The output of gate N22 is referred to as the print and enter pulse and feeds the binary to decimal converter 16.

Since information enters memory at a very fast rate and is drawn out at a comparatively slow but steady rate, there is a need to find out when the output has caught up to the input and the machine should be reset. Recall that during operation, the "A" commutator sits opposite the first empty level of memory; or if the memory is filled, the "A" commutator remains with a "1" state in the element stage. Also, the "Y" commutator has a "1" state in the 1 plus 2 stage, where 1 is the level of memory whose information is being sent to the printer. Therefore, the "Y" commutator has a "1" state in the 1 plus 2 stage, and the "A" commutator has a "1" state in its 1 stage, and the "X" commutator starts to recycle, the printer is about to receive an empty level of memory. The function desired to convey this information is designated by the letter E and has the Boolean function $E=(X1)(Y=A)$. Nor gates N23 through N34 in FIG. 37 are used to derive function E. Nor gate N36 inverts the function which is fed to the mode identification gates of FIG. 31 for the 00.00 print-out at this time. Also the outputs of nor gates N33 and N36 feed the summary control circuits of FIG. 39 which will be described.

When the function E occurs or when the "A" commutator shifts the "1" state into the eleventh stage, signifying that the memory has been filled, it is desired to inhibit any further information from entering the memory. This is done by stopping the interrogation pulse to the point cards until the memory has been cleared. The output of nor gate N35 of FIG. 37 flips flip-flop F17 in FIG. 38 whose W output performs this function. Flip-flop F17 is reset by the reset 3 pulse when the memory is cleared.

The system also has to recognize when the 00.00 print has been completed, so that reset 1 pulse can appear, to prepare the system for a new sequence. Nor gate N42 of FIG. 38 performs this function by recognizing when a W output "1" state signal is present, prior to the "1" state and reaching the last stage of the "A" commutator, the "X" commutator has a "1" state in the last stage thereof. A reset 1 pulse is also desired when a date and time print-out has been completed and the system is not in a sequence. This is determined, as we have seen before, by nor gate N19 in FIG. 35. Nor gate N41 in FIG. 38 combines these functions and flips flip-flop F16 to enable a nor gate N40 to produce the reset 1 pulse at the end of the reset pulse $P_r$ for 50 microseconds.

The conditions required for a reset 2 pulse are that the memory has been filled (which results in the "A" commutator having a "1" state in the last stage thereof) and that the printer has printed out the last line of memory. Nor gates N37 and N38 of FIG. 38 determine this and trip flip-flop F15 at this time. Flip-flop F15 enables nor gate N39 to produce a reset 2 pulse. The reset 3 pulse appears at the output of emitter follower E6 and, as has been noted before, appears when either reset pulse 1 or reset 2 appears. Thus, the input of emitter follower E6 is connected to the output of nor gates N39 and N40.

In the description of the specific logic of the exemplary recording system, only the normal operating mode of the system has been described. FIG. 39 shows the control circuitry for determining the operation of the system under normal, test, and summary modes of operation.

In the normal mode, lines T and L will be at ground and the output of emitter follower E8 will be the normal swamp pulse signal $P_s$ (FIG. 4). As previously indicated, this signal acts to prevent information from the field contacts from entering the point cards while the interrogation pulse is traversing the point cards.

The summary mode can only be initiated when no sequence is in process. This mode is initiated by depressing the off-normal-summary switch causing flip-flop F21 to flip. Flip-flop F21 is reset at the first end of the swamp signal following the release of the summary switch, by the signal $P_s$ fed to one of the inputs thereof. This triggers flip-flop F22 provided that S inhibit input is grounded. Flip-flop F22 is reset at the end of the reset pulse $P_r$ fed to one of the inputs thereof. Thus, line L feeding nor gate N45 acts to extend the swamp to the point cards once, for a 200 microsecond interval, covering the reset pulse ($P_r'$) internal. As previously indicated, the extended swamp pulse allows the reset pulse $P_r$ to reset the point card A bistables associated with abnormal variables so that the point cards that are in alarm look like new alarms to the system. Line L also sets flip-flop F20 whose B output inhibits the delay counter input (through gate N6, FIG. 34).

The L line also feeds nor gate N5 of FIG. 34 which drives the event line. This is to cover the situation when no points are in the alarm condition and a summary is demanded. In this case, the machine will print the time of day followed by a 00.00 print.

The test mode of operation is initiated by depressing the test switch which alarms every point in the system and sets flip-flop F18. The output of flip-flop F18, labeled Z, then sets flip-flop F19 and at the beginning of swamp pulse trips flip-flop F20, whose functions have just been described.

Z also inhibits the interrogation pulse to the point cards until the beginning of the first swamp pulse $P_s$ after the test switch is released when flip-flop F18 is reset. The $\overline{T}$ output of flip-flop F19 goes to the mode identification gates which have been described previously. The T output of flip-flop F19 extends the swamp pulse to the point cards so that no new information enters the point cards while the system is in test mode. The T output also feeds one of the inputs of the diode "or" gate D5 so that flip-flop F20 will not be reset when signal E appears. The other input of diode D4 labeled $\overline{Y=A}$ is a safety inhibit that releases just before signal E appears. If flip-flop F20 has not been reset when the reset 1 pulse appears, flip-flop F21 will be flipped, initiating a summary mode of operation. Thus, the test mode of operation is always followed by an automatic summary.

The interrogation pulse to the point cards comes from nor gate N48 (FIG. 40). In general, this pulse is like the $P_i$ waveform in FIG. 4 but it can be inhibited. The inhibits inputs for the interrogation pulse are input Z, which is a "1" state signal when the test switch is depressed, and input W, which is a "1" state signal when the memory is filled or the printer is about to print 00.00 indicating the end of a sequence. A third inhibit input, derived from nor gate N47, is activated when there is an error lockup operation and the system is not in the analysis mode. As previously indicated, the error lockup circuitry detects whether the last interrogation pulse entered has propagated through the point cards and has appeared in the code busses or the all points entered line in the time interval allowed. It performs this function in the following manner. The interrogation pulse leaves nor gate N48, trips flip-flop F25 and enters the point cards. If an event has not occurred, the pulse should appear at the input of emitter follower E10 feeding diode D5. However, if an event has occurred, the output of nor gate N4 (FIG. 34) feeding the other input of diode D5, should go negative for 0.0 milliseconds. Either of these happenings will flip-flop F26. If flip-flop F26 is set before the end of the swamp pulse $P_s$, flip-flop F25 will be reset, which inhibits the tripping of flip-flop F24 at the beginning of reset. But, if a pulse does not arrive at diode D5 before the end of a swamp pulse $P_s$, flip-flop F25 will not be reset and flip-flop F24 will trip, lighting the stop lamp through emitter follower E9 and nor gate N49, and inhibiting the next interrogation pulse. The non-arrival of the proper pulse at diode D5 would tend to indicate a missing or malfunctioning point card, or a bad connection. The only way to reset flip-flop F24 is with the start switch.

In the case of an error lockup, the analysis mode of operation provides a method for quickly determining the point card in question. When the analysis switch is depressed, flip-flop F23 is set and all of the functions of the test switch are initiated. In addition, the first flip-flop of the delay counter is set to a "1" state. Flip-flop F23 enables nor gate N46, which feeds nor gate N7 (FIG. 34). At the same time, flip-flop F23 removes the N47 inhibit on nor gate N48 and inhibits the action of the event line through nor gate N4 in FIG. 34. This prevents any information from getting into memory and prevents the initiation of any print action. At this time, the output of nor gate N6 in FIG. 34 is driven to ground by its input B as the alarm bus is pulsed. Thus, the following nor gate N7 only sees the output of nor gate N46 of FIG. 40 which results in a "1" state output of the nor gate N8 feeding the delay counter each time the alarm bus is pulsed. Therefore, the delay counter records the number of alarms received on the alarm bus (plus one count since the delay counter is initially set to one as previously explained).

If the missing point card was the $n$th card in the system, $n-1$ alarms would be received by the delay counter. The missing card would prevent any other cards from being interrogated. Therefore, the count registered in the delay counter, and visually presented on the analysis lamps, would indicate the numerical position of the missing point card.

Whenever the analysis switch is closed, flip-flop F24 is set through the action of flip-flop F23, causing the stop lamp to be energized. Flip-flop F23 is reset by the start switch. The analysis mode of operation is intended as a quick maintenance check procedure and should not be initiated when the system is in a sequence.

It should be understood that numerous modifications may be made of the exemplary forms of the invention described above without deviating from the broader aspects of the present invention.

What we claim as new and desire to protect by Letters Patent of the United States is:

1. A variable monitoring system for indicating the order in which a number of variables become abnormal, said system comprising: respective control means which respond to the normal and abnormal conditions of respective variables, each of said control means having an abnormal variable indicating state when the associated variable becomes abnormal and a normal variable indicating state when the associated variable is normal, storage means for recording the order in which the variables go abnormal and including successive storage positions in which information on the identity and timing information of abnormal variables may be recorded, interrogation means for sequentially interrogating the control means in a predetermined order and for storing in successive positions of said storage means the identity of control means as they are operated to their abnormal variable indicating states, print-out means for printing information in said storage in the order in which such information is stored in successive positions of said storage means, means for clearing said storage means when all the variable condition information in said storage means has been fed to said print-out means, timing means which is reset to zero prior to the feeding of a new sequence of information to said storage means and which starts counting time from zero when the information is fed to the first position of said storage means, means for storing in each storage position of said storage means the timing information indicated by said timing means at the time the variable identifying information is fed to the storage position, and means responsive to the clearing of said storage means for resetting said timing means to zero.

2. A variable monitoring system for monitoring the conditions of a number of variables, said system comprising: respective control means which respond to the abnormal conditions of the respective variables, each of said control means having an abnormal indicating state when the associated variable becomes abnormal, memory means having a number of successive storage positions for variable condition information, printout means for indicating in successive positions on a common record medium information sequentially fed thereto, first commutator means having a group of different states equal in number to said storage positions for effecting the feeding of variable identifying information respectively to said different storage positions in said memory means, second commutator means having a group of different states equal in number to said storage positions for effecting the feeding of said information from said different respective storage positions in said memory means, respective means associated with said first and second commutator means for advancing the same from an initial to successive states thereof respectively upon the feeding of information to and from a storage position of the memory means, the advance of the first and second commutator means occurring at random intervals determined by the feeding of information into and out of the memory means, interrogation means for sequentially interrogating the conditions of said control means and including means responsive to the abnormal indicating state of the interrogated control means by feeding information identifying the associated variable to the storage position of said memory means prepared to be entered by said first commutator means, and means for clearing the memory means, resetting said first and second commutator means and causing the printout means to print a sequence terminating character when the latter indicates that the first and second commutator means are in corresponding states at any point in their relative advancement.

3. The variable monitoring system set forth in claim 2 in which the first commutator means has an additional state indicating that all of the storage positions of the memory means are filled with information, in which the second commutator means has an additional state indicating that the information from all of the storage portions of the memory means has been fed to the print out means, and means responsive to the advance of the first and second commutator means to their additional states for clearing said memory means, for resetting said first and second commutator means, and for operating said print out means to print a symbol indicating that the information to be printed subsequently is not in the order in which the associated variable became abnormal.

4. The variable monitoring system set forth in claim 2 in which the first commutator means has an additional state indicating that all of the storage positions of the memory means are filled with information, in which the second commutator means has an additional state indicating that the information from all of the storage positions of the memory means has been fed to the print out means, means responsive to advancing the first commutator means to its additional state for arresting operation of the interrogation means, and means responsive to the advance of the first and second commutator means to their additional states for clearing said memory means, for resetting said first and second commutator means, for resuming operation of the interrogation means, and for operating said print out means to print a symbol indicating that the information then to be printed is not in the order in which the associated variables became abnormal.

5. In a variable monitoring system for monitoring the conditions of a number of variables, said system including control means for each variable which has an abnormal variable condition indicating state when the associated variable is abnormal and a normal variable indicating state when the associated variable is normal, the improvement comprising: interrogation means for sequentially interrogating the control means of the respective variables in a predetermined order and for effecting printout of the identification of an interrogated control means which is in an abnormal variable indicating state and the order in which such control means were interrogated relative to the control means which were previously operated to such state, means associated with each control means for generating a first signal when the control means is changed from a normal to an abnormal variable indicating state, system analysis means for effecting the identification of a defective control means, first means in said system analysis means responsive to operation of the system analysis means for placing all of the control means in an abnormal variable indicating state, second means in said system analysis means responsive to operation of said system analysis means for terminating the printout of said information on said control means and for initiating the interrogation of all of the control means, and third means in said system analysis means for terminating the interrogation of all said control means in response to absence of said signals from a control means and for counting the number of control means interrogated up to the point the interrogation of the control means was terminated.

References Cited by the Examiner

UNITED STATES PATENTS 2,987,704   6/1961   Gimpel _____ 340—172.5

ROBERT C. BAILEY, *Primary Examiner.*

G. D. SHAW, M. LISS, *Assistant Examiners.*